United States Patent
Maruyama et al.

(10) Patent No.: US 9,953,267 B2
(45) Date of Patent: Apr. 24, 2018

(54) CONTROL METHOD AND NON-TRANSITORY COMPUTER READABLE RECORDING MEDIUM

(71) Applicant: Panasonic Corporation, Osaka (JP)

(72) Inventors: Tomoaki Maruyama, Osaka (JP); Kotaro Sakata, Tokyo (JP); Kenji Kondo, Osaka (JP); Masayoshi Tojima, Osaka (JP); Hiroaki Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 749 days.

(21) Appl. No.: 14/360,834

(22) PCT Filed: Sep. 25, 2013

(86) PCT No.: PCT/JP2013/005687
§ 371 (c)(1),
(2) Date: May 27, 2014

(87) PCT Pub. No.: WO2014/050098
PCT Pub. Date: Apr. 3, 2014

(65) Prior Publication Data
US 2014/0324764 A1 Oct. 30, 2014

Related U.S. Application Data

(60) Provisional application No. 61/706,395, filed on Sep. 27, 2012.

(51) Int. Cl.
*G06N 5/04* (2006.01)
*G06Q 50/10* (2012.01)

(52) U.S. Cl.
CPC .............. *G06N 5/048* (2013.01); *G06Q 50/10* (2013.01)

(58) Field of Classification Search
None
See application file for complete search history.

(56) References Cited

U.S. PATENT DOCUMENTS 8,930,146 B2 * 1/2015 Katsukura .............. G01D 4/002
340/573.1
9,270,944 B2 * 2/2016 Brooks .............. H04N 7/17318
(Continued)

FOREIGN PATENT DOCUMENTS

EP 2745777 A1 * 6/2014 .......... A61B 5/1118
JP 2005-253609 9/2005
(Continued)

OTHER PUBLICATIONS

Kate Lyden, "Refinement, Validation and Application of a Machine Learning Method for Estimating Physical Activity and Sedentary Behavior in Free-Living People," PhD Thesis, University of Massachusetts at Amherst, Sep. 1, 2012.*
(Continued)

*Primary Examiner* — Kakali Chaki
*Assistant Examiner* — Fuming Wu
(74) *Attorney, Agent, or Firm* — Wenderoth, Lind & Ponack, L.L.P.

(57) ABSTRACT

A control method of the present disclosure is a control method of an information processing apparatus which includes a storage unit that stores predetermined resource information related to a resource required for a living activity of a user, the method including: an acquiring step of acquiring device information; an estimating step of estimating a living activity of the user; a competition extracting step of extracting a living activity group including living activi-
(Continued)

ties for which the resources are likely to compete among the living activities, based on the resource information; a resource judging step of judging whether a required resource has been secured for each of the living activities, based on the device information and the resource information; and an inhibition extracting step of extracting, as an inhibited living activity, a living activity for which it has been judged that the required resource has not been secured.

8 Claims, 18 Drawing Sheets

(56) References Cited

U.S. PATENT DOCUMENTS

| | | | | |
|---|---|---|---|---|
| 2008/0243675 | A1* | 10/2008 | Parsons | G06Q 40/00 705/37 |
| 2011/0010106 | A1* | 1/2011 | Katsukura | G01D 4/002 702/19 |
| 2011/0238192 | A1* | 9/2011 | Shah | G10L 19/018 700/94 |
| 2012/0119902 | A1* | 5/2012 | Patro | H04L 12/12 340/502 |
| 2012/0240177 | A1* | 9/2012 | Rose | H04N 21/252 725/116 |
| 2012/0271392 | A1* | 10/2012 | Fukui | A61N 1/0551 607/117 |
| 2013/0204415 | A1* | 8/2013 | Fregley | G06Q 30/02 700/94 |
| 2014/0324764 | A1* | 10/2014 | Maruyama | G06N 5/048 706/52 |

FOREIGN PATENT DOCUMENTS

| | | |
|---|---|---|
| JP | 2006-79166 | 3/2006 |
| JP | 2006-85609 | 3/2006 |
| JP | 2006-260561 | 9/2006 |
| JP | 2007-114830 | 5/2007 |
| JP | 2011-248923 | 12/2011 |
| JP | 2011248923 A * | 12/2011 |

OTHER PUBLICATIONS

International Search Report dated Nov. 5, 2013 in International (PCT) Application No. PCT/JP2013/005687.

* cited by examiner

FIG. 4

| REFRIGERATOR IS OPENED AND CLOSED | FOOD PROCESSOR | IH COOKWARE | DINING TABLE LIGHT IS ON | |
|---|---|---|---|---|
| TAKING OUT DRINK (90%) | CREATE DRINK (50%) | COOK FOOD MATERIALS (90%) | TABLE SETTING (90%) | |
| PREPARE FOOD MATERIALS (5%) | PRELIMINARY ARRANGEMENTS OF FOOD MATERIALS (50%) | | | |
| | | | | |

FIG. 6

| USER | PLACE | LIVING ACTIVITY CLASS NAME | TIME |
|---|---|---|---|
| ⋮ | ⋮ | ⋮ | ⋮ |
| | | | t0 t1 t2 t3 t4 t5 t6 t7 t8 t9 t10 |
| USER X1 | HOUSE X2 | COOKING | ──────▶ (t4–t10) |
| USER X1 | HOUSE X2 | RADIO | ──────▶ (t4–t10) |
| USER Y1 | HOUSE X2 | SLEEPING | ────────────▶ (t0–t10) |
| USER A1 | HOUSE A2 | WATCHING TELEVISION | ────────────▶ (t0–t10) |
| USER A1 | HOUSE A2 | COOKING | ──────▶ (t1–t7) |
| USER A1 | HOUSE A2 | WASHING CLOTHES | ────────▶ (t0–t8) |
| USER B1 | HOUSE B2 | WASHING FACE | ▶ (t0–t1) |
| USER C1 | HOUSE C2 | STAYING | ────────────▶ (t0–t10) |
| USER D1 | STORE D2 | SHOPPING | ──▶ (t0–t3) |
| ⋮ | ⋮ | ⋮ | ⋮ |

502: USER X1/X1/Y1 rows
501: USER A1 rows

FIG. 8

| NUMBER | LIVING ACTIVITY CLASS NAME | REQUIRED RESOURCES |
|---|---|---|
| 1 | WATCHING TELEVISION | ELECTRIC POWER: 300W<br>HUMAN: VISUAL AND AUDITORY SENSES |
| 2 | COOKING | ELECTRIC POWER: 500W<br>HUMAN: VISUAL AND AUDITORY SENSES AND HANDS<br>WATER: 5 LITERS, 3 LITERS/MINUTE |
| 3 | WASHING | ELECTRIC POWER: 400W<br>WATER: 70 LITERS, 10 LITERS/MINUTE |
| 4 | AIR CONDITIONER | ELECTRIC POWER: 1000W |

801

| RESOURCE | SHARABLE OR NOT | UPPER LIMIT |
|---|---|---|
| HUMAN: VISUAL SENSE | NON-SHARABLE | --- |
| HUMAN: AUDITORY SENSE | NON-SHARABLE | --- |
| HUMAN: HANDS | NON-SHARABLE | --- |
| ELECTRIC POWER | SHARABLE | 2000W |
| WATER | SHARABLE | 20 LITERS/MINUTE |

| NUMBER | LIVING ACTIVITY CLASS NAME | REQUIRED RESOURCES |
|---|---|---|
| 1 | WATCHING TELEVISION | ELECTRIC POWER: 300W<br>HUMAN: VISUAL AND AUDITORY SENSES |
| 2 | COOKING | ELECTRIC POWER:<br>PREPARATION OF FOOD MATERIALS: 100W ---803<br>PRELIMINARY ARRANGEMENTS: 100W<br>COOKING: 500W<br>TABLE SETTING: 100W<br>HUMAN: VISUAL AND AUDITORY SENSES AND HANDS<br>WATER: 5 LITERS, 3 LITERS/MINUTE |
| 3 | WASHING | ELECTRIC POWER: 400W<br>WATER: 70 LITERS, 10 LITERS/MINUTE |
| 4 | AIR CONDITIONER | ELECTRIC POWER: 1000W |

CONTROL METHOD AND NON-TRANSITORY COMPUTER READABLE RECORDING MEDIUM

TECHNICAL FIELD

The present invention relates to context-oriented computing. In particular, the present invention relates to a technique for providing services to users using the context of the real world.

BACKGROUND ART

A user context is a word having meanings. The user context is used as a word indicating all items of information on users. The user context is also used as a word indicating a place, an activity, and a state of a user at a certain point in time. In the present description, the user context is used as the latter meaning.

Conventionally, it has been often performed in the world of the world wide web (WWW) to detect the context of a user automatically and provide a service based on the detection results. For example, this service allows a user to write an appointment into an electronic schedule note so that an email is delivered on the day before the appointment so as not to miss the appointment.

However, since it is difficult to comprehend the context of the real world, at the present situation, such a service is performed only in limited fields. This is because such an infrastructure that a sufficiently large number of sensors are widely present is required in order to automatically comprehend the context of the real world using a computer or the like.

However, in recent years, this situation has been changed due to the development of apparatuses, called smart devices or smart appliances, which have a network function and can collect sensing information and a manipulation history and an operation history of the apparatuses.

When such smart apparatuses such as smart devices or smart appliances are sufficiently popularized among the people, the activity and situation (user contexts) of a user at a certain point in time can be estimated from information (the user's manipulation history of an apparatus or the sensing information) on the user collected from these smart apparatuses.

Although various services that use the estimated user contexts can be considered, one of the important services among them is a service that detects an event relating to a user that "things are not going properly" and takes measures against the event.

For example, Patent Document 1 discloses a technique of incorporating a sensor into a stick used by an elderly person so as to detect a contact between a stick and the ground and judging that "the elderly person is walking safely" if the stick and the ground make contact periodically and otherwise judging that "something dangerous has happened". The system disclosed in Patent Document 1 aims to provide a caring service for elderly persons who are out for a walk using the judging results.

Similarly, Patent Document 2 discloses a technique of extracting sleeping hours, an activity quantity, an excretion frequency, and the like of a care recipient from sensors attached to the care recipient and issuing a warning when the extracted data indicates an abnormality in the living pattern of the care recipient. Moreover, Patent Document 3 discloses a technique of monitoring biological information such as an electrocardiographic signal of a user and automatically detecting an abnormality.

However, Patent Documents 1 to 3 require a further improvement.

Patent Document 1: Japanese Patent Application Publication No. 2006-85609
Patent Document 2: Japanese Patent Application Publication No. 2007-114830
Patent Document 3: Japanese Patent Application Publication No. 2005-253609

SUMMARY OF THE INVENTION

In order to solve the conventional problem, an aspect of the present invention is a control method of an information processing apparatus which is connected to a network and includes a storage unit that stores predetermined resource information related to a resource required for a living activity of a user, the method including: an acquiring step of acquiring device information from a device connected to the network; an estimating step of estimating a living activity of the user based on the device information acquired in the acquiring step; a competition extracting step of, when living activities are estimated as the living activity of the user in the estimating step, extracting a living activity group including living activities for which the resources are likely to compete among the living activities estimated in the estimating step, based on the resource information stored in the storage unit; a resource judging step of judging whether a required resource has been secured for each of the living activities included in the living activity group extracted in the competition extracting step, based on the device information acquired in the acquiring step and the resource information stored in the storage unit; and an inhibition extracting step of extracting, as an inhibited living activity, a living activity for which it has been judged in the resource judging step that the required resource has not been secured.

With the above aspect, it is possible to realize a further improvement.

BRIEF DESCRIPTION OF THE DRAWINGS

FIG. 4 is a diagram schematically illustrating a table representing probabilities of sub-activities corresponding to log information.

FIG. 6 is a diagram schematically illustrating all living activities estimated by an estimating unit.

FIG. 8 is a diagram illustrating a living activity resource table representing the resources required for executing living activities.

FIG. 17 is a diagram illustrating a living activity resource table according to the fourth embodiment.

DESCRIPTION OF EMBODIMENTS (Story Before Inventing Aspect According to Present Disclosure)

First, an idea of an embodiment of the present disclosure will be described.

The methods disclosed in Patent Documents 1 to 3 detect abnormalities by comparing user contexts which are of the same type but are of different points in time. In Patent Document 1, an abnormal value is detected from how the user walks with a stick. In Patent Document 2, an abnormal value is detected from a daily change in the sleeping activity or the like. In Patent Document 3, cardiac activities are compared in chronological order.

In contrast, in the real world, users live while executing user contexts in parallel or switching between a main context and a sub-context. In particular, this trend is strong in living activities (activities in the real world for enjoying daily life such as housework, watching entertainment, sleeping, excretion activity, works, or car driving) which are one type of contexts in the daily life of users.

For example, a user may drive or watch a television receiver while doing something else or may perform cooking and washing in parallel using household appliances. In such a situation of the real world that a certain user performs living activities in parallel, it is difficult for the conventional technique to detect an event that "things are not going properly." This is because a competition or switching occurs between contexts occurring in parallel. Since the conventional technique that focuses on the contexts of the same type is too simple, it is difficult to cope with the competition or switching.

For example, when a single user performs a television watching activity and a cooking activity in parallel, a situation in which the user is busy in cooking is an activity that deviates from the purpose in view of the original purpose of the television watching activity "watching and listening to contents". In some sense, such a situation can be said to be an abnormal situation in which "things are not going properly."

A sponsor of a television program or a program producer who wants to raise a viewer rating may want to detect this situation and take measures so that users watch the television more. Moreover, from the ecological perspective to reduce unnecessary electric power consumption, the television should be turned off automatically if the television is not watched.

However, the conventional technique focuses on one context and can only determine whether the context is abnormal as compared to the past contexts. Thus, in the conventional technique, it is difficult to detect such a type of situation that the context is abnormal as compared to the other types of contexts. Based on the above observation, the present inventors have invented respective embodiments of the invention described below.

First Embodiment

Figure 1:
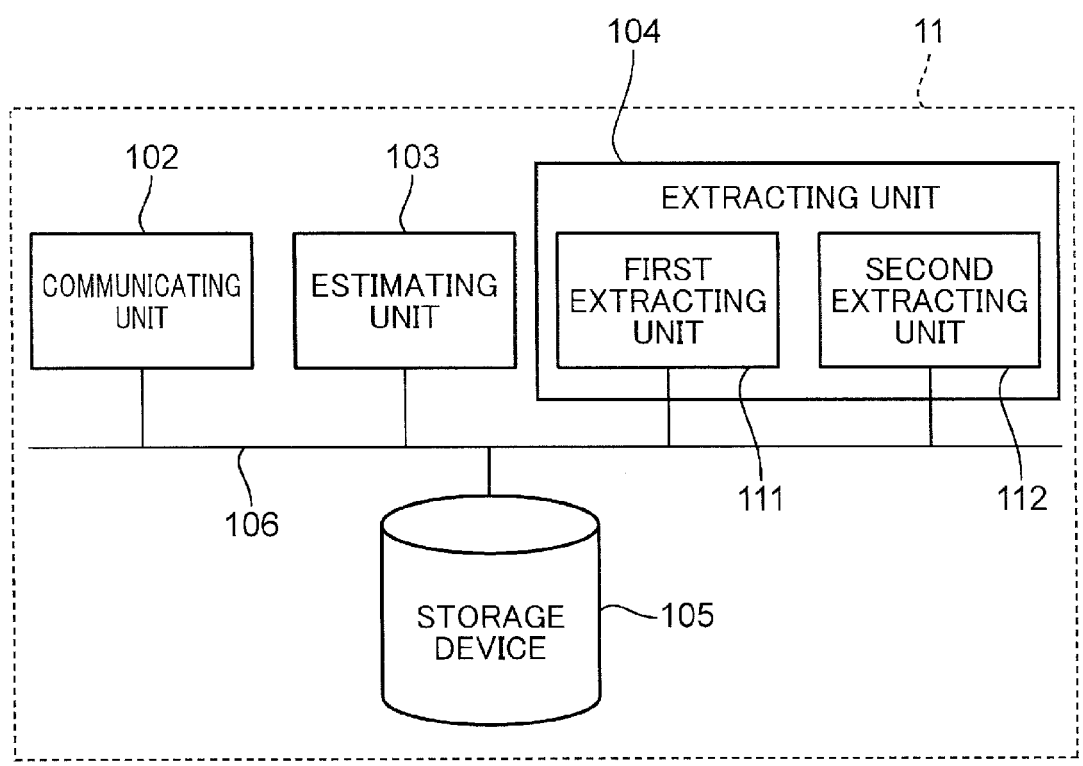
FIG. 1 is a block diagram illustrating a configuration of a server according to a first embodiment.
Figure 2:
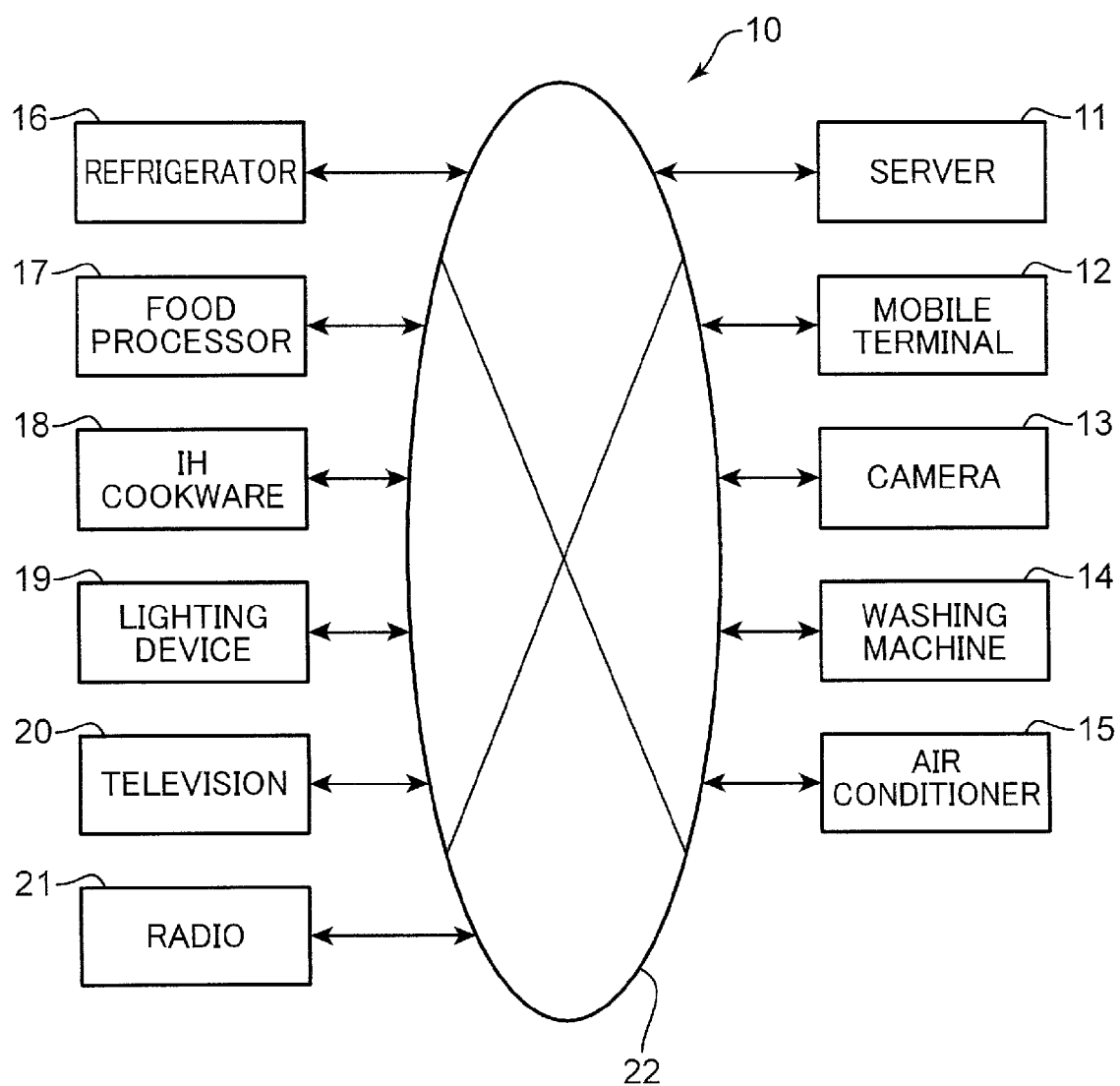
FIG. 2 is a block diagram illustrating a configuration of an entire control system that includes the server of FIG. 1.

FIG. 1 is a block diagram illustrating a configuration of a server according to a first embodiment. FIG. 2 is a block diagram illustrating a configuration of an entire control system including the server of FIG. 1.

In FIG. 1, a server 11 includes a communicating unit 102, an estimating unit 103, an extracting unit 104, and a storage device 105. The extracting unit 104 includes a first extracting unit 111 and a second extracting unit 112. The communicating unit 102, the estimating unit 103, the extracting unit 104, the storage device 105, the first extracting unit 111, and the second extracting unit 112 are connected to a bus 106.

In FIG. 2, a control system 10 includes the server 11, a mobile terminal 12, a camera 13, a washing machine 14, an air conditioning unit (hereinafter referred to as an "air conditioner") 15, a refrigerator 16, a food processor 17, an induction heating cookware (hereinafter referred to as an "IH cookware") 18, a lighting device 19, a television receiver (hereinafter referred to as a "television") 20, and a radio 21. The respective elements of the control system 10 are configured to be able to communicate with each other via a network 22.

The mobile terminal 12 is a mobile phone or a smartphone, for example. Alternatively, the mobile terminal 12 may be a tablet computer having a communication function.

The camera 13 captures an image of a face or the like of a person and transmits photographic information such as facial information and position information of the person photographed to the server 11. The camera 13, the washing machine 14, the air conditioner 15, the refrigerator 16, the food processor 17, the IH cookware 18, the lighting device 19, the television 20, and the radio 21 are examples of devices connected to the network 22. The devices connected to the network 22 are not limited to those illustrated in FIG. 2. Alternatively, the other devices other than those illustrated in FIG. 2 may be connected to the network 22. Further alternatively, the other devices may be connected to the network 22 in addition to those illustrated in FIG. 2. The other devices include a detector such as a temperature detector, for example.

In FIG. 1, the communicating unit 102 exchanges information with the external devices of the server 11 via the network 22. In the present first embodiment, the communicating unit 102 receives log information of the respective devices from the washing machine 14, the air conditioner 15, the refrigerator 16, the food processor 17, the IH cookware 18, the lighting device 19, the television 20, and the radio 21.

The log information is information representing a change in a device. As a specific example, the log information is information representing a manipulation history and a setting value of a device, a change in the setting value, and a change in an internal state of the device (for example, a mnemonic or a character label that imparts a meaning to an operation state of a device, a value or the like of a sensor included in the device, and the like).

Moreover, the communicating unit 102 receives the photographic information from the camera 13. Further, when a detector such as a temperature detector is connected to the network 22, for example, the communicating unit 102 receives a detection value from the detector. The detection value means a numerical value, a numerical vector, or the like. In the following description, the log information, the photographic information, and the detection value are collectively referred to as "device information."

Further, the communicating unit 102 transmits designated data to an external device designated by an internal module of the server 11 according to a request from the internal module.

The estimating unit 103 estimates a living activity of a person from the device information received by the communicating unit 102.

The living activity is one type of user contexts. The user context is general information on a user and includes at least four elements (user, place, time, and activity). The time may be a time segment. The activity may be a state. Moreover, the living activity is a user context of which the activity (or the state) is related to the daily life of the user. Although the living activity is described as being one type of user contexts, an inclusive relationship is not clearly defined for these two elements. The living activity has the meaning of a generic term of user contexts that are strongly related to a daily life.

The extracting unit 104 extracts living activities that have not achieved their original purposes among living activities related to a certain user. The extracting unit 104 includes the first extracting unit 111 and the second extracting unit 112. The first extracting unit 111 extracts a living activity group including living activities being in a competitive relationship among living activities that the estimating unit 103 estimates. The second extracting unit 112 extracts a living activity of which the purpose is inhibited as a secondary living activity and extracts an inhibiting living activity as a primary living activity, among the living activities being in a competitive relationship included in the living activity group extracted by the first extracting unit 111.

Here, the "living activities related to a certain user" is living activities that can be in a competitive relationship. Moreover, the living activity of which the original purpose has not been achieved is a living activity of which the purpose is inhibited due to the competitive relationship.

When a living activity is represented by four elements (user, place, time segment, and living activity class name), a certain user is denoted by U, a place is denoted by P, a time segment is denoted by T, a living activity is denoted by B, and a set of all living activities is denoted by L. The "living activities related to a certain user" is specifically living activities included in the time segment T among living activities L(U,T) in the set L and is all living activities of which the users are equal to the user U or of which the places in the time segment T are the same as or at the vicinity of the place P of the user U.

This is expressed by the following expression.

$$L(U,T)=\{(U0,P0,T0,B0)|(U0,P0,T0,B0) \in L, U0=U \wedge T0=T\}$$

$$\cup$$

$$\{(U1,P1,T0,B0)|(U1,P1,T0,B1) \in L, P0 \cong P1 \wedge T0=T\} \quad (1)$$

Here, P0≅P1 represents that places P0 and P1 are at the same position or at the vicinity (the inside of the same house or the like). Moreover, the place P1 is such a place P1 that (U0,P1,T0,B0)∈L ∧ (U1,P1,T0,B1)∈L.

The above expression (1) is described in the following words. The expression (1) is a union of sets of "all living activities of the user U in a certain time segment T" and "all living activities of a person U1 different from the user U at the same place as or at the vicinity of the user U in a certain time segment T". For example, the above expression (1) represents all living activities of the user U and a person U1 living with the user U when the user U is in a house.

The living activity of which the original purpose has not been achieved is a living activity in a state where its purpose is inhibited due to a certain reason. A living activity is an activity acted by a user and has a certain purpose. For example, an activity of watching a television program has a purpose of watching certain video contents. For example, when a user has a visitor while watching a television program and has to deal with the visitor, since the purpose of watching video contents is inhibited, it can be thought that this activity of watching the television program is inhibited.

The living activity of the inhibiting side is referred to as a primary living activity, and the living activity of the inhibited side is referred to as a secondary living activity. In the above case, the activity of dealing with a visitor corresponds to a primary living activity, and the activity of watching a television program corresponds to a secondary living activity. Moreover, when a certain living activity may probably inhibit another living activity, these two living activities are said to be "in a competitive relationship." The primary living activity and the secondary living activity are naturally in the competitive relationship.

When resources required for executing two living activities compete with each other, the two living activities have a competitive relationship. In the above case, human visual and auditory senses are required for both living activities of dealing with a visitor and watching a television program. Thus, the resources of the human visual and auditory senses compete with each other.

When different persons are in the same house, the resources required for the living activities of the different persons may probably compete with each other. When a database of the entire living activities is searched, it is possible to retrieve living activities which may probably compete with each other by retrieving a range of living activities represented by the above expression (1). The person U1 different from the user U in the above expression (1) can be said to be a person who is in a block (for example, a house) that uses the same resources (for example, electric power) as the user U.

The storage device 105 includes a hard disk, a semiconductor memory, or the like, for example. The storage device 105 is used as a storage area for storing data of the respective units of the server 11. In FIG. 1, although the storage device 105 is illustrated as one independent storage device, the present embodiment is not limited to this. Alternatively, the storage device 105 may be provided in a manner of being distributed to the respective units of the server 11. Further alternatively, the storage device 105 may be provided outside the server 11. Tables described later are stored in the storage device 105.

Figure 3:
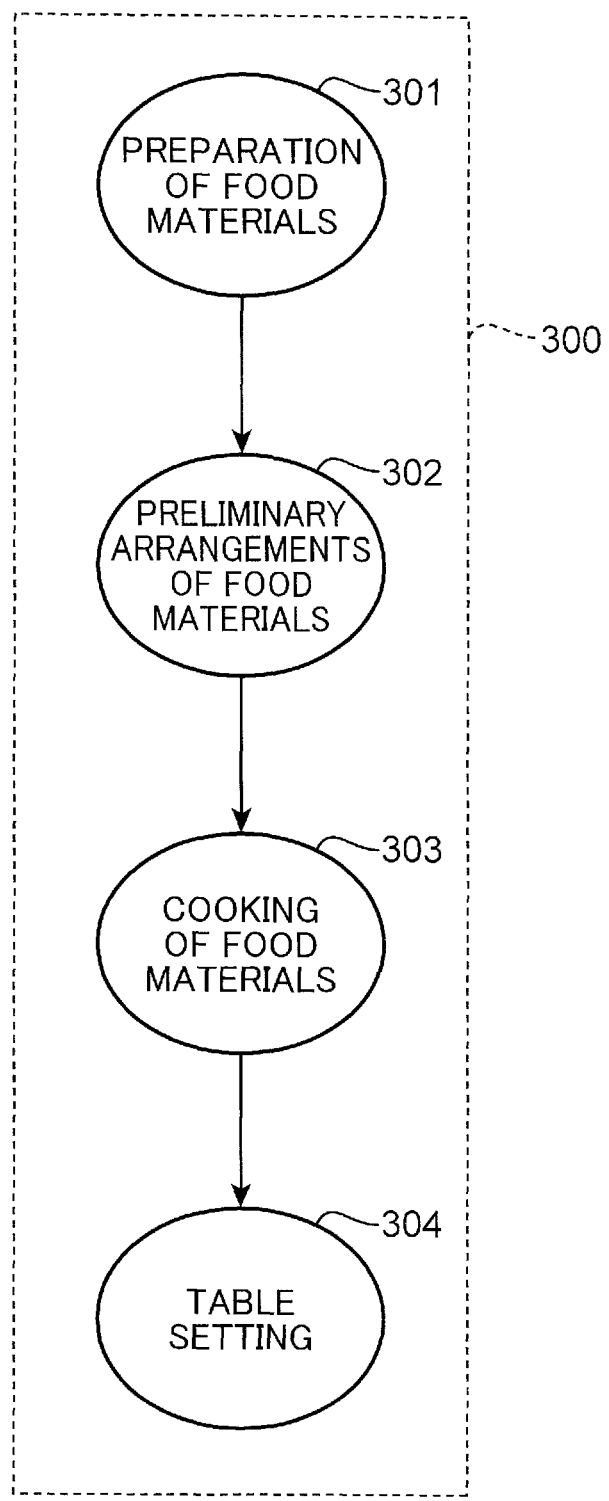
FIG. 3 is a diagram schematically illustrating a cooking activity task model.
Figure 5:
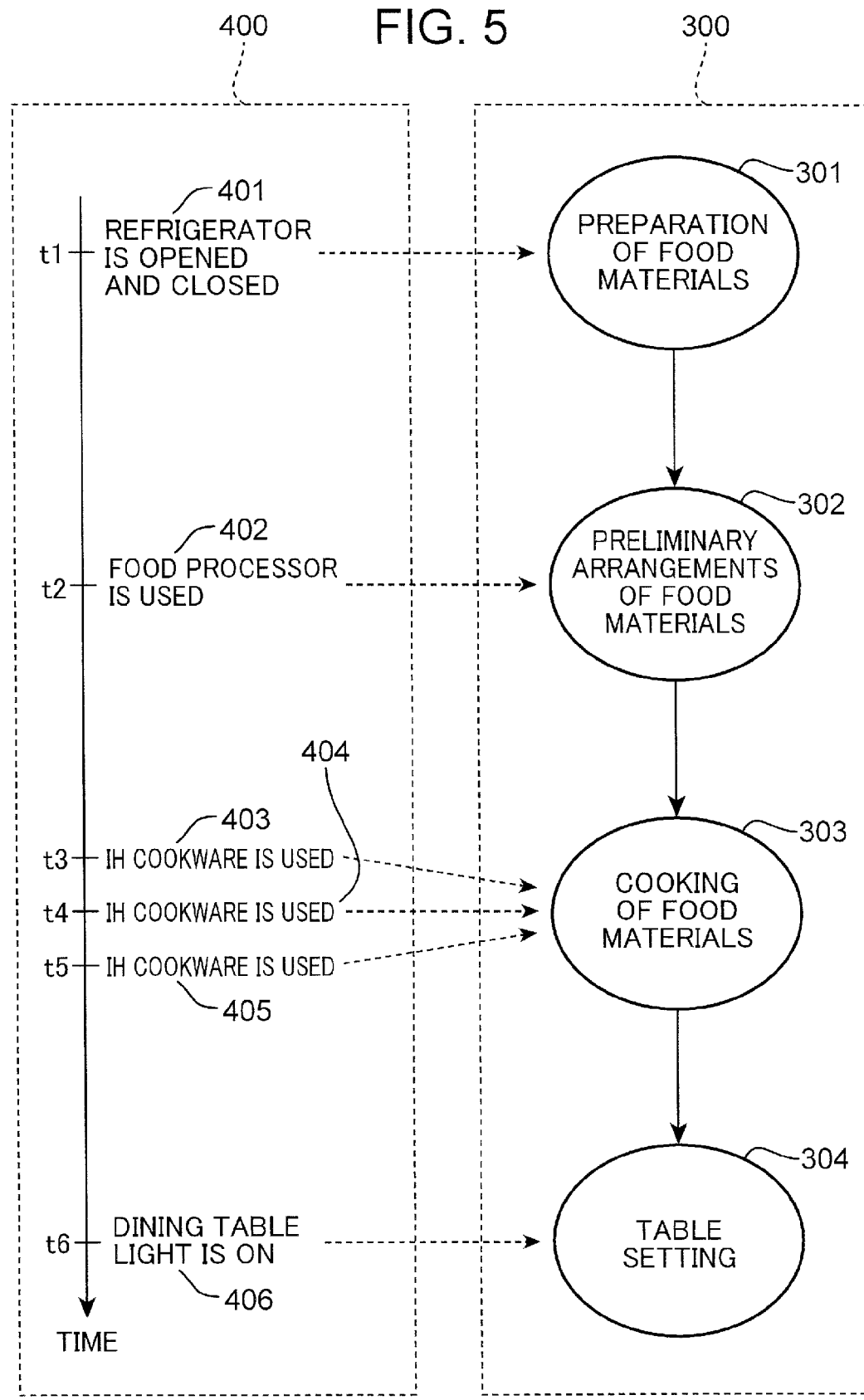
FIG. 5 is a diagram illustrating a relationship between device log information and the cooking activity task model.

FIG. 3 is a diagram schematically illustrating a cooking activity task model. FIG. 4 is a diagram schematically illustrating a table representing probabilities of sub-activities corresponding to log information. FIG. 5 is a diagram illustrating the relationship between device log information 400 and a cooking activity task model 300. FIG. 6 is a diagram schematically illustrating all living activities estimated by the estimating unit 103. All items of log information illustrated in FIG. 5 are the log information of a certain user A1 and the place is the inside of a house A2. The operations of the communicating unit 102 and the estimating unit 103 will be described with reference to FIGS. 1 to 6.

The communicating unit 102 receives device information (in the present first embodiment, specifically, log information and photographic information) periodically (for example, every 10 minutes) from devices (in the present first embodiment, the camera 13, the washing machine 14, the air conditioner 15, the refrigerator 16, the food processor 17, the IH cookware 18, the lighting device 19, the television 20, and the radio 21) connected to the network 22.

The estimating unit 103 acquires the device information received by the communicating unit 102. The estimating unit 103 estimates living activities based on the acquired device information.

Various methods of estimating user contexts like living activities from the device information including the log information can be considered. In the present first embodiment, the estimating unit 103 introduces a task model for living activities. The estimating unit 103 uses a maximum-likelihood estimation method of estimating a most likely task model as a living activity suitable for the device information by calculating back from the obtained device information including the log information of the respective devices.

In the cooking activity task model 300 illustrated in FIG. 3, the cooking activity includes four sub-activities of a sub-activity 301 of "preparation of food materials," a sub-activity 302 of "preliminary arrangements for food materials," a sub-activity 303 of "cooking of food materials," and a sub-activity 304 of "table setting". For the sake of convenience, the cooking activity task model 300 illustrated in FIG. 3 is very simplified.

In the first embodiment, the estimating unit 103 performs a process of recognizing the face of a user photographed by the camera 13 to distinguish users. Moreover, the position of the distinguished user is determined based on the photographing position of the camera 13. As a result, for example, when the user A1 is positioned at the vicinity of the refrigerator 16 and the refrigerator 16 is opened and closed, the estimating unit 103 estimates that the user A1 has opened and closed the refrigerator 16. Alternatively, the estimating unit 103 may estimate the position of the user A1 based on radio waves output from the mobile terminal 12.

In estimation of living activities according to the present first embodiment, the activities of a number of persons are observed and recorded in advance and the results learned statistically are used. For example, learning is carried out in such a way that, when the switch of the television 20 is turned on, this activity is a living activity of watching the television 20. As the result of learning, a table representing the probabilities of sub-activities corresponding to the log information illustrated in FIG. 4, for example, is stored in the storage device 105.

For example, as illustrated in FIG. 4, a probability of 90% for the sub-activity of "taking out a drink" and a probability of 5% for the sub-activity of "preparation of food materials" are set to the log information indicating "the refrigerator is opened and closed." This setting can be set for the case of a user who frequently opens a refrigerator to take out a drink.

When the refrigerator 16 is opened and closed by a user, the estimating unit 103 searches the table of FIG. 4 stored in the storage device 105. As the result of search, two sub-activities of "taking out a drink" and "preparation of food materials" are hit. When log information indicating that the IH cookware 18 or the like is used is not received by the communicating unit 102 after the refrigerator 16 is opened and closed, the estimating unit 103 estimates that this activity is a sub-activity of "taking out a drink."

In FIG. 5, first, at time t1, log information 401 indicating "the refrigerator 16 is opened and closed" is received by the communicating unit 102 and written to the storage device 105. When the log information is written, the estimating unit 103 selects a sub-activity that is likely to generate the log information from the sub-activities in a task model group stored in the storage device 105.

In the present first embodiment, first, the sub-activity 301 of "preparation of food materials" is selected for the log information 401. Similarly, at time t2, the sub-activity 302 of "preliminary arrangements of food materials" is selected for the log information 402 indicating "the food processor 17 is used." At time t3, t4, and t5, the sub-activity 303 of "cooking of food materials" is selected for items of log information 403, 404, and 405 indicating "the IH cookware 18 is used." At time t6, the sub-activity 304 of "table setting" is selected for log information 406 indicating "a dining table light is turned on." When these events (items of log information 401 to 406) included in the device log information 400 are continuously detected, it can be estimated as a whole with a certain likelihood that the user is performing living activities according to the cooking activity task model 300.

In the log information of the real world, it cannot be said that the sub-activities in the task model match all items of log information. Thus, the estimating unit 103 calculates a most likely task model among partially matching task models according to a mathematical and scientific method such as Bayes estimation (maximum likelihood estimation method). Moreover, the estimating unit 103 estimates that the obtained task model is living activities that the user A1 executes in the house A2 in the respective periods.

It should be noted that a certain queue of items of log information is estimated to result from a certain living activity based on a probability (that is, with a certain likelihood). In the cooking activity illustrated in FIG. 5, the likelihood of a cooking activity increases gradually if the sub-activities match as the time advances from t1 to t6. That is, the likelihood of the cooking activity does not jump from 0 to 1 at a certain point in time.

In general, when the likelihood of a living activity exceeds an appropriate threshold (for example, 70%), the estimating unit 103 estimates that the living activity is performed. Alternatively, the estimating unit 103 may narrow the estimation results down to one living activity by applying conditions that there is only one candidate living activity.

In the example of the cooking activity illustrated in FIG. 5, the estimating unit 103 may determine that the likelihood of a cooking activity has exceeded a threshold at the vicinity of time t4, for example, and estimate that a cooking activity is executed. The estimating unit 103 may estimate the future living activity of the user from the present situation. This will be described in a fourth embodiment.

FIG. 6 schematically illustrates the living activities that the estimating unit 103 estimates from the log information associated with users and places in the period from t0 to t10. In FIG. 6, the cameras 13 provided in respective houses X2, A2, B2, C2, and D2 monitor the inside of the respective houses. The estimating unit 103 estimates which living activities are executed in the respective houses. The estimating unit 103 recognizes the faces of users based on the photographic information of the camera 13 to distinguish the respective users.

In the house X2, the estimating unit 103 estimates that the user X1 is executing a cooking activity based on the log information in the period from t4 to t10. Moreover, the estimating unit 103 estimates that the user X1 is listening to the radio 21 while cooking based on the log information indicating that the power of the radio 21 at the vicinity of the user X1 is turned on. Further, the estimating unit 103 estimates that the user Y1 is sleeping based on the log information indicating that the lighting device in a room where the user Y1 is present is unlit in the house X2.

In FIG. 6, a living activity group 501 includes three living activities of the user A1 in the house A2. Moreover, a living activity group 502 includes two living activities of the user X1 and one living activity of the user Y1 in the house X2.

Actually, the estimating unit 103 estimates the living activities in real-time from time t0 to time t10. In FIG. 6, for the sake of convenience, although the living activities estimated by the estimating unit 103 are uniformly depicted by solid-line arrows, the living activities are hypotheses at the respective points in time, and the likelihoods thereof increase or decrease with the elapse of time.

In parallel with the estimating unit 103 estimating the living activities in real-time with the elapse of time, the first extracting unit 111 extracts living activities being in the competitive relationship from the living activities estimated at that point in time.

Figure 7:
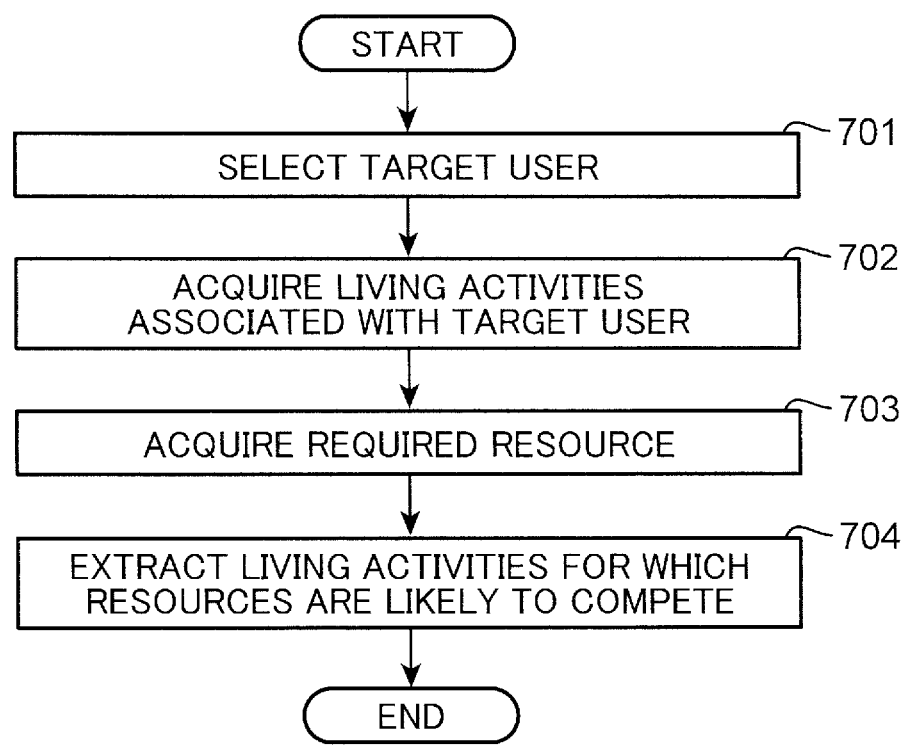
FIG. 7 is a flowchart illustrating an operation procedure of a first extracting unit.
Figure 9:
FIG. 9 is a diagram illustrating a resource attribute table representing attributes of resources.
Figure 10:
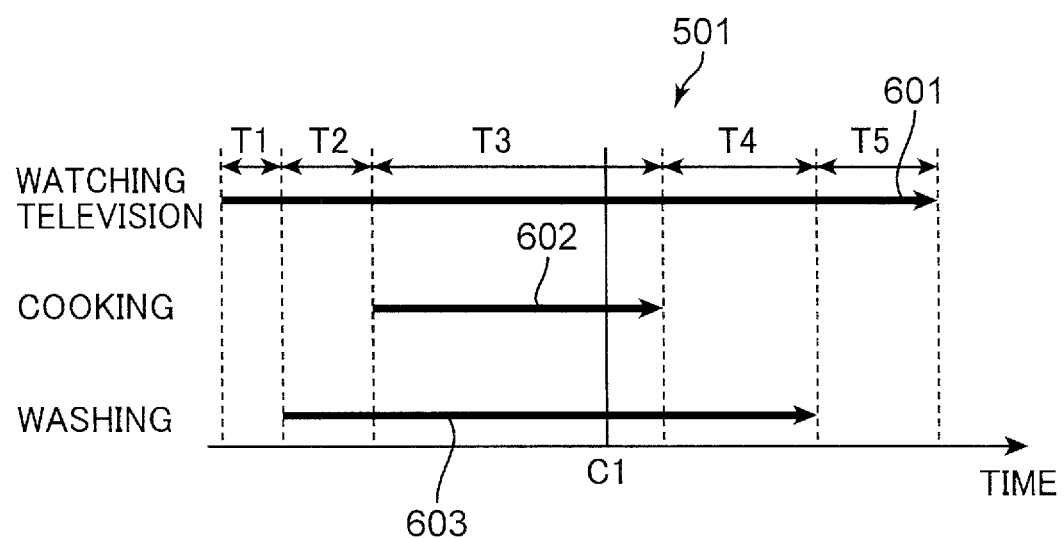
FIG. 10 is a diagram illustrating a portion of one living activity group illustrated in FIG. 6.

FIG. 7 is a flowchart illustrating an operation procedure of the first extracting unit 111. FIG. 8 is a diagram illustrating a living activity resource table 801 representing resources required for executing living activities. FIG. 9 is a diagram illustrating a resource attribute table 802 that represents attributes of resources. FIG. 10 is a diagram illustrating a portion of the living activity group 501 illustrated in FIG. 6. As described above, the tables 801 and 802 illustrated in FIGS. 8 and 9 are stored in the storage device 105. The operation of the first extracting unit 111 will be described with reference to FIGS. 1, 2, and 6 to 10.

The first extracting unit 111 extracts living activities being in the competitive relationship, associated with a certain user according to the procedure illustrated in FIG. 7. The first extracting unit 111 executes the operation of FIG. 7 every 10 minutes, for example.

In FIG. 7, first, in step 701, the first extracting unit 111 selects a target user. The target user is selected from the users registered for the service of the control system 10. In the present first embodiment, the user A1 is selected. Subsequently, in step 702, the first extracting unit 111 acquires living activities associated with the user A1.

The "living activities associated with a certain user" are defined in the expression (1). Thus, among the living activities illustrated in FIG. 6, when step 702 is executed at time t4, three living activities of a television watching activity, a cooking activity, and a washing activity included in the living activity group 501 performed by the user A1 are acquired as the living activities associated with the user A1.

When the user X1 is selected in step 701, the living activities associated with the user X1 are the living activities executed by the user X1 and the living activities executed at the vicinity of the user X1. Thus, in step 702, three living activities included in the living activity group 502 illustrated in FIG. 6 are acquired.

Strictly speaking, the cooking activity of the user A1 is not executed in a time segment [t0, t1]. Thus, in the time segment [t0, t1], the living activities associated with the user A1 are the television watching activity and the washing activity only, and the cooking activity is not included. In the following description, it is described that step 702 of FIG. 7 is executed in the time segment [t1, t7].

In FIG. 10, only the living activity group 501 including the three living activities of FIG. 6 is extracted to be illustrated. Since the person who executes all the living activities is the user A1 and the places where all the living activities are executed are the house A2, illustration thereof is omitted. In FIG. 10, a television watching activity 601 indicates that the estimating unit 103 has estimated that the user A1 has watched the television in the house A2 in the time segment T1 to T5. Similarly, a cooking activity 602 indicates that the estimating unit 103 has estimated that cooking has been performed in the time segment T3. Further, a washing activity 603 indicates that the estimating unit 103 has estimated that washing has been performed in the time segment T2 to T4.

As described above, in step 702 of FIG. 7, three living activities of the television watching activity 601, the cooking activity 602, and the washing activity 603 are acquired as the living activities associated with the user A1 in the time segment T3.

Subsequently, in step 703, the first extracting unit 111 reads the living activity resource table 801 illustrated in FIG. 8 from the storage device 105 and acquires resources required for executing the respective living activities acquired in step 702.

The resources are the functions or parts of a person or a device, energy, materials, and the like required for executing the living activity. In the present first embodiment, for the sake of simplicity, the resources required for executing the living activity are fixedly determined in advance for each living activity class and are stored in the storage device 105 as the living activity resource table 801 illustrated in FIG. 8.

The resources include human resources and physical resources as illustrated in the living activity resource table 801 of FIG. 8. Specifically, the human resources are the five senses and the hands of a person. The physical resources include electric power and water, for example. In the present first embodiment, the resources required for executing a living activity are stored in the storage device 105 as the living activity resource table 801 based on the specifications described in the catalog of a cookware or the like, for example.

In step 703, specifically, the first extracting unit 111 acquires the resources required for executing the respective three living activities (that is, the television watching activity 601, the cooking activity 602, and the washing activity 603) associated with the user A1 by referring to the living activity resource table 801 illustrated in FIG. 8. The first extracting unit 111 acquires electric power of 300 W and the human visual and auditory senses as the resources required for executing the television watching activity 601, for example. Similarly, the first extracting unit 111 acquires the resources required for executing the cooking activity 602 and the washing activity 603.

Subsequently, in step 704, the first extracting unit 111 extracts living activities for which the resources are likely to compete with each other among the respective living activities acquired in step 702 by referring to the resource attribute table 802 illustrated in FIG. 9.

As illustrated in FIG. 9, the resource attribute table 802 includes data related to sharable or not (that is, whether the resource is sharable or exclusive) and an upper limit of a possible supply amount as the attributes of the respective resources included in the living activity resource table 801 of FIG. 8. As can be understood from the resource attribute table 802 illustrated in FIG. 9, for example, the human visual and auditory senses are set to be non-sharable. That is, a person cannot use the visual and auditory senses simultaneously for living activities. Moreover, since electric power is sharable and is thus dividable, an upper limit thereof is defined. Thus, if different living activities use electric power, the living activities are likely to compete with each other.

In step 704, the first extracting unit 111 examines the resources required for the respective living activities (that is, the television watching activity 601, the cooking activity 602, and the washing activity 603). Moreover, the first extracting unit 111 examines for each of the resources whether the resource is likely to compete with other resources.

First, as for the television watching activity 601, in step 703, an electric power and the human visual and auditory senses are acquired from the living activity resource table 801 as the required resources. Moreover, according to the resource attribute table 802, the human visual and auditory senses and the electric power are likely to compete with each other if another living activity uses the same resources.

Thus, the resources required for executing the other living activities (that is, the cooking activity 602 and the washing activity 603) are examined. As for the cooking activity 602, in step 703, the electric power and the human visual and auditory senses are acquired as the required resources. Thus, the cooking activity 602 is likely to compete with the television watching activity 601. Similarly, the first extracting unit 111 examines for other resources.

As a result, the first extracting unit 111 judges that as for the human visual and auditory senses, a combination of the television watching activity 601 and the cooking activity 602 are likely to compete with each other. Thus, the first extracting unit 111 extracts a living activity group Q1 including the television watching activity 601 and the cooking activity 602. Moreover, the first extracting unit 111 judges that as for the electric power, a combination of the television watching activity 601, the cooking activity 602, and the washing activity 603 are likely to compete with each other. Thus, the first extracting unit 111 extracts a living activity group Q2 including the television watching activity 601, the cooking activity 602, and the washing activity 603. Further, the first extracting unit 111 judges that as for the water, a combination of the cooking activity 602 and the washing activity 603 are likely to compete with each other. Thus, the first extracting unit 111 extracts a living activity group Q3 including the cooking activity 602 and the washing activity 603.

In this way, the extracting process of the first extracting unit 111 with respect to the television watching activity 601, the cooking activity 602, and the washing activity 603, which are the three living activities associated with the user A1 in the time segment T3 in FIG. 10, ends.

The resources are not limited to those illustrated in FIGS. 8 and 9. For example, places such as a lavatory or a modular bath can be considered as the resources. In general, the lavatory and the modular bath are used by one person at a time. Thus, the lavatory and the modular bath are set to be non-sharable.

Figure 11:
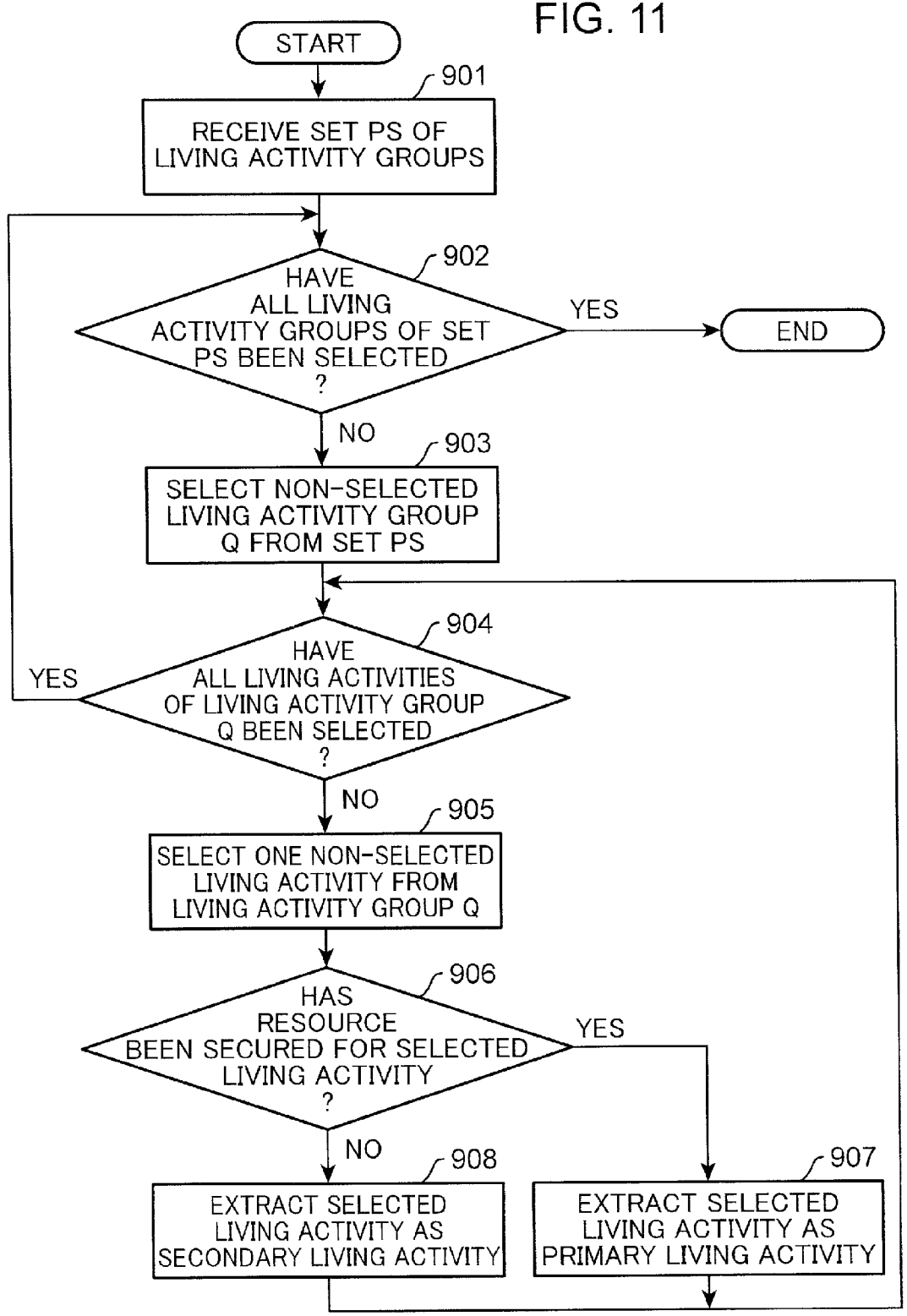
FIG. 11 is a flowchart illustrating an operation procedure of a second extracting unit.

FIG. 11 is a flowchart illustrating an operation procedure of the second extracting unit 112. The second extracting unit 112 executes the operation procedure illustrated in FIG. 11 whenever the first extracting unit 111 executes the operation illustrated in FIG. 7. The operation of the second extracting unit 112 will be described with reference to FIGS. 1, 2 and 11.

First, an overview of each step of FIG. 11 will be described. In step 901, the second extracting unit 112 receives a set PS of living activity groups which are likely to compete, extracted by the first extracting unit 111. Subsequently, in step 902, the second extracting unit 112 judges whether all living activity groups Q included in the set PS received in step 901 have been selected.

When all living activity groups Q included in the set PS have been selected (step 902: YES), the second extracting unit 112 ends the process. On the other hand, when there is a non-selected living activity group in the living activity groups Q included in the set PS (step 902: NO), the second extracting unit 112 proceeds to step 903. In step 903, the second extracting unit 112 selects the non-selected living activity group Q from the set PS.

Subsequently, in step 904, the second extracting unit 112 judges whether all living activities included in the living activity group Q have been selected. When all living activities included in the living activity group Q have been selected (step 904: YES), the second extracting unit 112 proceeds to step 902. On the other hand, when there is a non-selected living activity included in the living activity group Q (step 904: NO), the second extracting unit 112 proceeds to step 905. In step 905, the second extracting unit 112 selects one of non-selected living activities from the living activity group Q.

Subsequently, in step 906, the second extracting unit 112 judges whether resources have been secured for the selected living activity. The second extracting unit 112 performs this judgment based on the device log information 400 illustrated in FIG. 5, for example. When the second extracting unit 112 judges that resources have been secured for the selected living activity (step 906: YES), the second extracting unit 112 proceeds to step 907. On the other hand, when the second extracting unit 112 judges that resources have not been secured for the selected living activity (step 906: NO), the second extracting unit 112 proceeds to step 908.

In step 907, the second extracting unit 112 extracts the selected living activity as a primary living activity and proceeds to step 904. In step 908, the second extracting unit 112 extracts the selected living activity as a secondary living activity and proceeds to step 904.

Next, specific examples of the present first embodiment in the respective steps of FIG. 11 will be described. In step 901, the second extracting unit 112 receives the set PS of three living activity groups Q1, Q2, and Q3. In step 903, the second extracting unit 112 selects the living activity group Q1, for example, from the set PS. In step 905, the second extracting unit 112 selects the cooking activity 602, for example, from the living activity group Q1.

The living activity group Q1 is a living activity group of which the resource is likely to compete in relation to the human visual and auditory senses. Thus, in step 906, the second extracting unit 112 judges whether the human visual and auditory senses have been secured for the cooking activity 602.

In general, when it is possible to directly detect the place of use of human resources, the detection value may be used in judgment of the activity in which the human resources are used. On the other hand, when it is not possible to detect the place of use of human resources, the place of use may be estimated by an indirect method or it is necessary to directly ask the user using a sound or a display.

In a method of directly detecting the place of use of human resources, for example, in the case of a visual sense, the object that the user is watching may be read using a visual line camera that detects the visual line of the user as the camera 13. Moreover, in the case of hands, the use of hands may be estimated from the log information such as opening and closing of a refrigerator or the like.

On the other hand, as a method of indirectly estimating the place of use of human resources, it can be estimated from the log information that a device is frequently manipulated that the required resources such as the visual sense and the hands have been secured. Moreover, the place of use may be judged from the position of the user detected based on the photographic information of the camera 13. For example, when a user is positioned in a kitchen, it can be estimated that the user is cooking.

The cooking activity 602 is a task that the estimating unit 103 has estimated from the device log information 400 of FIG. 5. The second extracting unit 112 analyzes the device log information 400 to understand that the user A1 frequently manipulates the cookware in order to execute the cooking activity 602. For example, the second extracting unit 112 understands from the items of log information 403 to 405 that the user A1 manipulated the IH cookware 18 three times in the period of t3 to t5.

Thus, in step 906, the second extracting unit 112 judges that resources have been secured for the cooking activity 602 (the human visual and auditory senses) (step 906: YES). In step 907, the second extracting unit 112 extracts the cooking activity 602 as a primary living activity and proceeds to step 904.

Subsequently, since the television watching activity 601 in the living activity group Q1 has not been selected (step 904: NO), the second extracting unit 112 selects the television watching activity 601 in step 905. In step 906, the second extracting unit 112 judges whether resources have been secured for the television watching activity 601.

When the second extracting unit 112 has already judged that resources (the human visual and auditory senses) have been secured for the cooking activity 602, the second extracting unit 112 judges that the cooking activity 602 is executed preferentially. Moreover, as illustrated in the resource attribute table 802 of FIG. 9, the human visual and auditory senses are not sharable. As a result, the second extracting unit 112 judges that the visual and auditory sense resources have not been secured for the television watching activity 601 (step 906: NO).

Alternatively, when log information such as channel manipulation or volume manipulation of the television 20 is not received by the communicating unit 102, the second extracting unit 112 may judge that resources (the human visual and auditory senses) have not been secured for the television watching activity 601.

In step 908, the second extracting unit 112 extracts the television watching activity 601 as a secondary living activity (inhibited living activity) and proceeds to step 904. In step 904, since all living activities of the living activity group Q1 have been selected (step 904: YES), the second extracting unit 112 proceeds to step 902.

In step 902, since the living activity groups Q2 and Q3 have not been selected (step 902: NO), the second extracting unit 112 selects the living activity group Q2 in step 903. In step 904, since the three living activities of the living activity group Q2 have not been selected (step 904: NO), the second extracting unit 112 proceeds to step 905.

In step 905, the second extracting unit 112 sequentially selects the television watching activity 601, the cooking activity 602, and the washing activity 603 included in the living activity group Q2. In step 906, the second extracting unit 112 sequentially judges whether resources have been secured for the television watching activity 601, the cooking activity 602, and the washing activity 603.

The living activity group Q2 is a living activity group of which the resource is likely to compete in relation to electric power. Thus, in step 906, the second extracting unit 112 judges whether electric power has been secured for the television watching activity 601, the cooking activity 602, and the washing activity 603.

From the resource attribute table 802 illustrated in FIG. 9, it can be understood that electric power is sharable and the upper limit is 2000 W. On the other hand, from the living activity resource table 801 illustrated in FIG. 8, it can be understood that the electric power required for the television watching activity 601, the cooking activity 602, and the washing activity 603 is 300 W, 500 W, and 400 W, respectively. Thus, it can be understood that the sum of electric power required for the three living activities is 1200 W and is equal to or smaller than the upper limit of 2000 W.

Thus, in step 906, the second extracting unit 112 judges that required electric power has been secured for all of the television watching activity 601, the cooking activity 602, and the washing activity 603 (step 906: YES). In step 907, the second extracting unit 112 extracts all of the television watching activity 601, the cooking activity 602, and the washing activity 603 as primary living activities.

Subsequently, in step 902, since the living activity group Q3 has not been selected (step 902: NO), the second extracting unit 112 selects the living activity group Q3 in step 903. In step 904, since the two living activities of the living activity group Q3 have not been selected (step 904: NO), the second extracting unit 112 proceeds to step 905.

In step 905, the second extracting unit 112 sequentially selects the cooking activity 602 and the washing activity 603 included in the living activity group Q3. In step 906, the second extracting unit 112 sequentially judges whether resources have been secured for the cooking activity 602 and the washing activity 603.

The living activity group Q3 is a living activity group of which the resource is likely to compete in relation to water. Thus, in step 906, the second extracting unit 112 judges whether water has been secured for the cooking activity 602 and the washing activity 603.

From the resource attribute table 802 illustrated in FIG. 9, it can be understood that water is sharable and the upper limit is 20 liters/minute. On the other hand, from the living activity resource table 801 illustrated in FIG. 8, it can be understood that the water required for the cooking activity 602 and the washing activity 603 is 3 liters/minute and 10 liters/minute, respectively. Thus, it can be understood that the sum of the water required for the two living activities is 13 liters/minute and is equal to or smaller than the upper limit of 20 liters/minute.

Thus, in step 906, the second extracting unit 112 judges that required water has been secured for all of the cooking activity 602 and the washing activity 603 (step 906: YES). In step 907, the second extracting unit 112 extracts all of the cooking activity 602 and the washing activity 603 as primary living activities.

As the result of the operation of FIG. 11, the second extracting unit 112 extracts the television watching activity 601 as an inhibited living activity. The second extracting unit 112 judges that the television watching activity 601 is inhibited by the cooking activity 602 in the time segment T3. In the present embodiment, the server 11 corresponds to an example of the information processing apparatus, the storage device 105 corresponds to an example of the storage unit, the operation of the estimating unit 103 acquiring the device information received by the communicating unit 102 corresponds to an example of the acquiring step, the operation of the estimating unit 103 estimating the living activity based on the acquired device information corresponds to an example of the estimating step, step 704 of FIG. 7 corresponds to an example of the competition extracting step, step 906 of FIG. 11 corresponds to an example of the resource judging step, and step 908 of FIG. 11 corresponds to an example of the inhibition extracting step.

As described above, in the first embodiment, the estimating unit 103 estimates the living activities of a user, the first extracting unit 111 extracts a living activity group of which the resources are likely to compete, and the second extracting unit 112 extracts a living activity for which the resource has not been secured as an inhibited living activity. Thus, according to the first embodiment, it is possible to take measures for the inhibited living activity in such a manner to alert the attention of the user.

Second Embodiment

Figure 12:
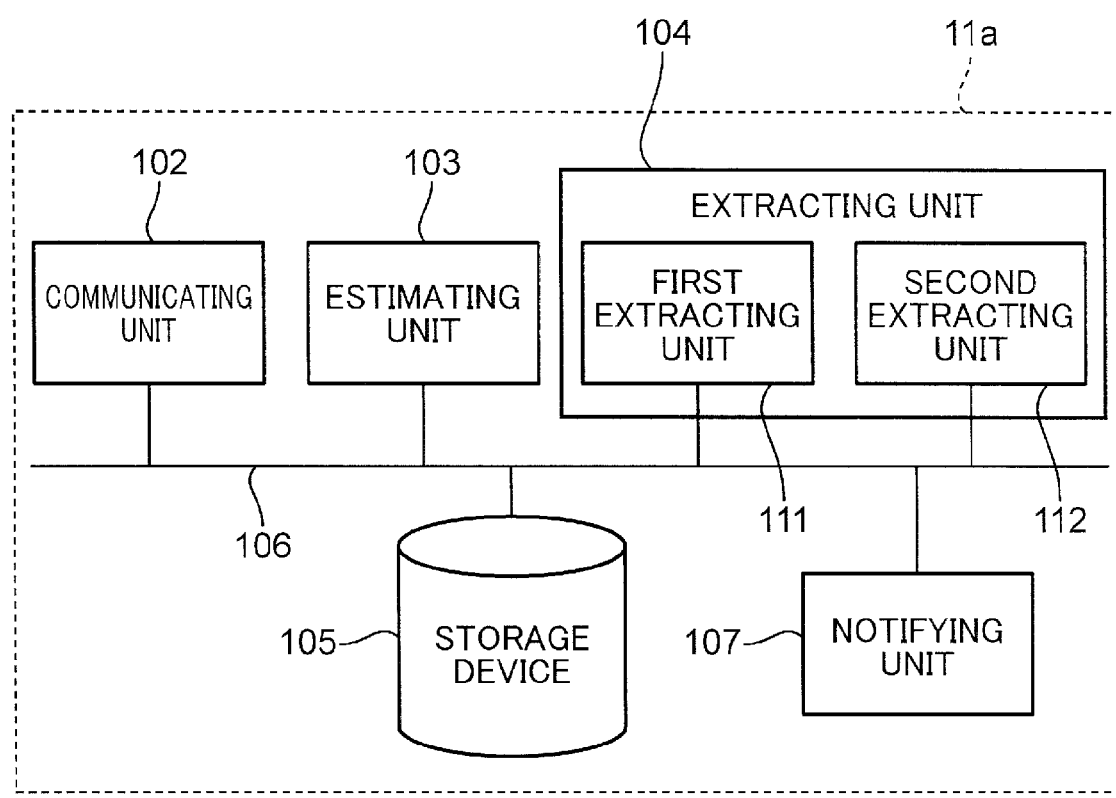
FIG. 12 is a block diagram illustrating a configuration of a server according to a second embodiment.

FIG. 12 is a block diagram illustrating a configuration of a server according to a second embodiment. In the second embodiment, the same components as those of the first embodiment will be denoted by the same reference numerals. Hereinafter, the second embodiment will be described focusing on a difference from the first embodiment.

As illustrated in FIG. 12, a server 11a includes a communicating unit 102, an estimating unit 103, an extracting unit 104, a storage device 105, and a notifying unit 107. The extracting unit 104 includes a first extracting unit 111 and a second extracting unit 112. The communicating unit 102, the estimating unit 103, the extracting unit 104, the storage device 105, the notifying unit 107, the first extracting unit 111, and the second extracting unit 112 are connected to a bus 106. The control system of the second embodiment is the same as that of the first embodiment illustrated in FIG. 2, except that the control system includes the server 11a instead of the server 11.

When the inhibited living activity is extracted by the second extracting unit 112, the notifying unit 107 detects the primary living activity with respect to the inhibited living activity. That is, the notifying unit 107 detects a living activity for which the resource required for executing the inhibited living activity has been secured. The notifying unit 107 extracts a device associated with the detected primary living activity. The device associated with the primary living activity means a device that has generated the log information which causes the estimating unit 103 to estimate the primary living activity. Further, the notifying unit 107 retrieves a device having a user notifying function among the devices associated with the primary living activity.

In the second embodiment, for example, in step 908 of FIG. 11, the television watching activity 601 is inhibited by the cooking activity 602 at time C1 of FIG. 10, and is extracted as an inhibited living activity. Then, first, the notifying unit 107 extracts a device associated with the cooking activity 602. In the second embodiment, specifically, the device associated with the cooking activity 602 is the refrigerator 16 that generated the log information 401 in FIG. 5, the food processor 17 that generated the log information 402, and the IH cookware 18 that generated the log information 403.

In the second embodiment, the IH cookware 18 includes an audio user interface. When text is input from the outside, the IH cookware 18 converts the input text into an audio signal and outputs the audio signal from a speaker. Thus, in the second embodiment, the notifying unit 107 retrieves a device having a user notifying function to find the IH cookware 18. The notifying unit 107 outputs information indicating that the television watching activity 601 is inhibited as text "The television in the living room remains turned on." The notifying unit 107 transmits the text and a notification control command for outputting the text as an audio signal to notify the user to the IH cookware 18 via the communicating unit 102.

Upon receiving the notification control command, the IH cookware 18 outputs an audible message "The television in the living room remains turned on" based on the input text. In this way, a warning is issued to the user. In the present embodiment, the server 11a corresponds to an example of the information processing apparatus, the operation of the notifying unit 107 corresponds to an example of the notification control step, the television 20 corresponds to an example of the first apparatus, and the mobile terminal 12 and the IH cookware 18 correspond to examples of a second apparatus.

As described above, in the second embodiment, the notifying unit 107 notifies the user of information on an inhibited living activity via a device associated with an inhibiting living activity. Thus, according to the second embodiment, it is possible to warn the user of the inhibited living activity.

Modification of Second Embodiment

Figure 13:
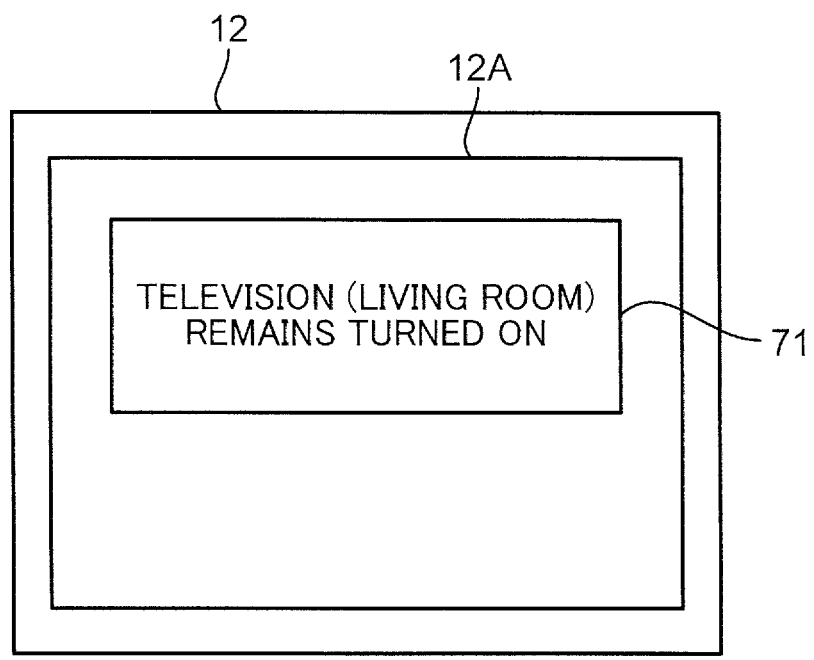
FIG. 13 is a diagram illustrating an example of a screen displayed on a display portion of a mobile terminal.

FIG. 13 is a diagram illustrating an example of a screen displayed on a display portion 12A of the mobile terminal 12. In the second embodiment, alternatively, the notifying unit 107 may display a message 71 on the display portion 12A of the mobile terminal 12 as illustrated in FIG. 13 instead of or in addition to the IH cookware 18. In this modification, the notifying unit 107 retrieves a device having a user notifying function to find the mobile terminal 12 having the display portion 12A.

The notifying unit 107 transmits a notification control command for displaying a message 71 "The television (living room) remains turned on" to the mobile terminal 12 via the communicating unit 102. Upon receiving the notification control command, the mobile terminal 12 displays the message 71 "The television (living room) remains turned on" on the display portion 12A. In this modification, a warning can be issued to the user similarly to the second embodiment.

Third Embodiment

Figure 14:
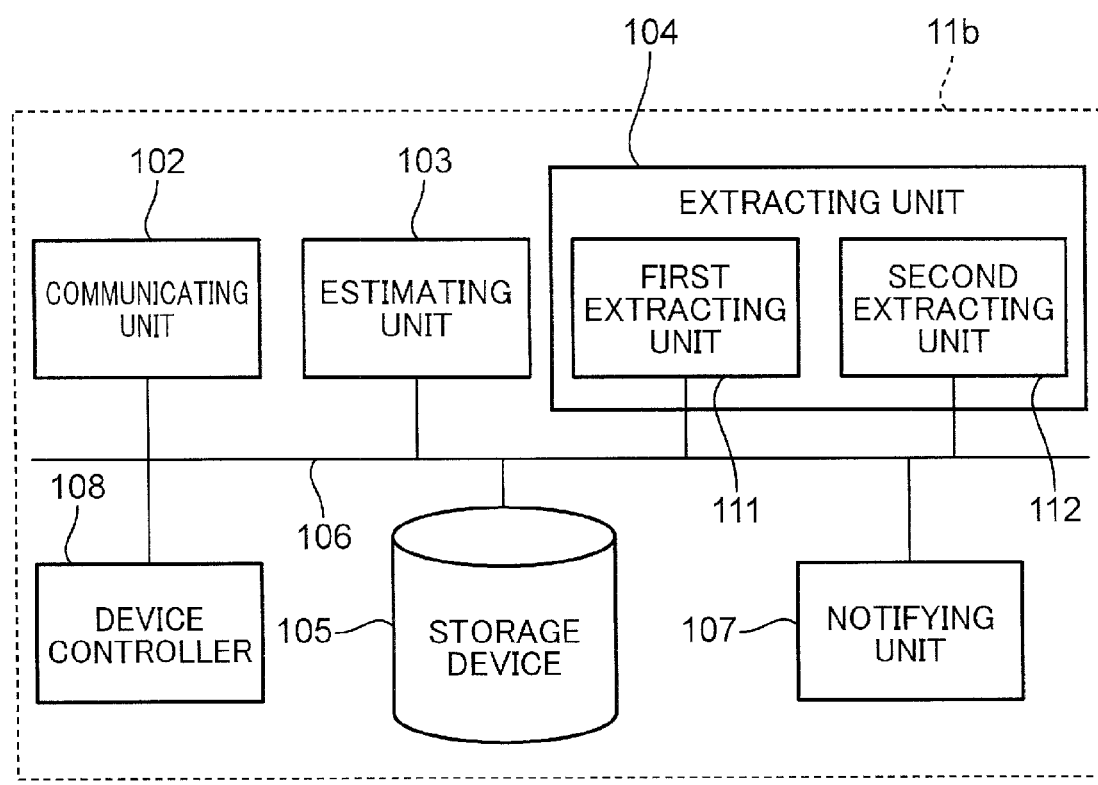
FIG. 14 is a block diagram illustrating a configuration of a server according to a third embodiment.

FIG. 14 is a block diagram illustrating a configuration of a server according to a third embodiment. In the third embodiment, the same components as those of the first and second embodiments will be denoted by the same reference numerals. Hereinafter, the third embodiment will be described focusing on a difference from the first and second embodiments.

As illustrated in FIG. 14, a server 11b includes a communicating unit 102, an estimating unit 103, an extracting unit 104, a storage device 105, a notifying unit 107, and a device controller 108. The extracting unit 104 includes a first extracting unit 111 and a second extracting unit 112. The communicating unit 102, the estimating unit 103, the extracting unit 104, the storage device 105, the notifying unit 107, the device controller 108, the first extracting unit 111, and the second extracting unit 112 are connected to a bus 106. The control system of the third embodiment is the same as that of the first embodiment illustrated in FIG. 2, except that the control system includes the server 11b instead of the server 11.

In the third embodiment, the IH cookware 18 includes an audio user interface similarly to the second embodiment.

In the third embodiment, similarly to the second embodiment, for example, in step 908 of FIG. 11, the television watching activity 601 is inhibited by the cooking activity 602 at time C1 of FIG. 10, and is extracted as an inhibited living activity. Then, the notifying unit 107 transmits text "The television in the living room remains turned on. Are you sure you want to turn off the television?" and a notification control command for outputting the text as an audio signal to notify the user to the IH cookware 18 via the communicating unit 102.

Upon receiving the notification control command, the IH cookware 18 outputs an audible message "The television in the living room remains turned on. Are you sure you want to turn off the television?" based on the input text. Here, for example, the user speaks out "Turn off the television." Then, the IH cookware 18 transmits log information indicating that the speech "Turn off the television" has been output to the server 11b.

Upon receiving the log information indicating that the speech "Turn off the television" has been output from the IH cookware 18, the device controller 108 transmits a power control command for turning off the power of the television 20 to the television 20 via the communicating unit 102. Upon receiving the power control command, the television 20 turns off its power. In the present embodiment, the server 11b corresponds to an example of the information processing apparatus, the operation of the device controller 108 corresponds to an example of the power control step, and the television 20 corresponds to an example of the first apparatus.

As described above, in the third embodiment, when the power control command is transmitted from the device controller 108 to the television 20, the power of the television 20 is turned off. Thus, according to the third embodiment, it is possible to turn off the power of a device associated with the inhibited living activity. As a result, according to the third embodiment, it is possible to prevent unnecessary consumption of electric power.

First Modification of Third Embodiment

The instruction of the user for turning off the power of the television 20 is not limited to a speech. Alternatively, a specific button of a household electrical appliance, for example, may be temporarily used as a power button of the television. For example, the notifying unit 107 transmits text "The television in the living room remains turned on. Press the heat button for three seconds or longer to turn off the television" and a notification control command for outputting the text as an audio signal to notify the user to the IH cookware 18 via the communicating unit 102.

Upon receiving the notification control command, the IH cookware 18 outputs an audible message "The television in the living room remains turned on. Press the heat button for three seconds or longer to turn off the television" based on the input text. Here, for example, the user presses a heat button for three seconds or longer. Then, the IH cookware 18 transmits log information indicating that the heat button has been pressed for three seconds or longer to the server 11b.

Upon receiving the log information indicating that the heat button has been pressed for three seconds or longer from the IH cookware 18, the device controller 108 transmits a power control command for turning off the power of the television 20 to the television 20 via the communicating unit 102. Upon receiving the power control command, the television 20 turns off the power. In the first modification, the same advantages as the third embodiment can be obtained.

Second Modification of Third Embodiment

Figure 15:
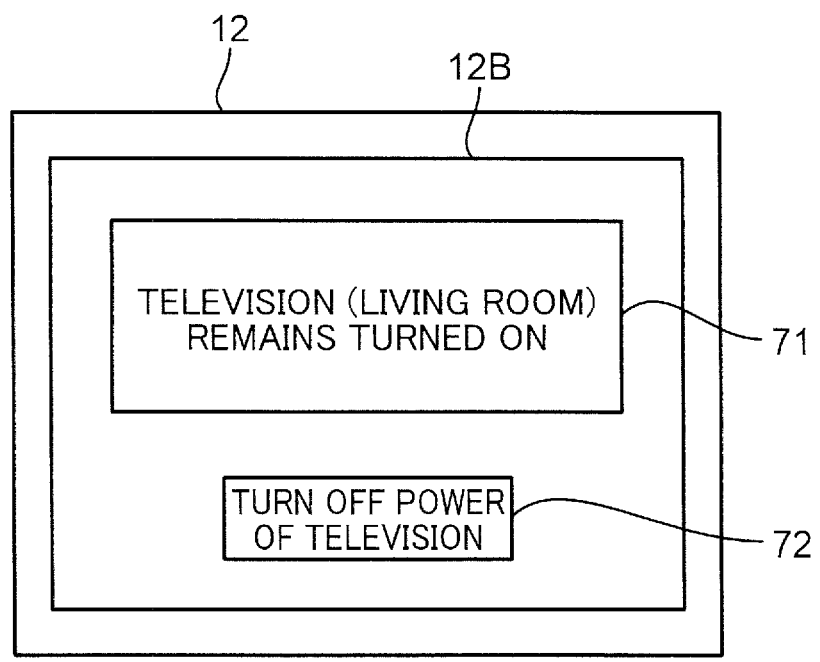
FIG. 15 is a diagram illustrating an example of a screen displayed on a display portion of a mobile terminal.

FIG. 15 is a diagram illustrating an example of a screen displayed on a display portion 12B of the mobile terminal 12. Further alternatively, in the third embodiment, the notifying unit 107 may display a message 71 and an operation button 72 on the display portion 12B of the mobile terminal 12 as illustrated in FIG. 15 instead of or in addition to the IH cookware 18. In the third modification, the display portion 12B of the mobile terminal 12 has a touch panel function. Moreover, the notifying unit 107 retrieves a device having a user notifying function to find the mobile terminal 12 having the display portion 12B.

The notifying unit 107 transmits a notification control command for displaying a message 71 "The television (living room) remains turned on" to the mobile terminal 12 via the communicating unit 102. Upon receiving the notification control command, the mobile terminal 12 displays the message 71 "The television (living room) remains turned on" on the display portion 12B.

The device controller 108 transmits a control command for displaying the operation button 72 including a message "Turn off the power of television" on the display portion 12B to the mobile terminal 12 via the communicating unit 102. When the operation button 72 is operated, the mobile terminal 12 transmits the log information indicating the operation to the server 11b.

Further, upon receiving the log information indicating that the operation button 72 has been operated from the mobile terminal 12, the device controller 108 transmits a power control command for turning off the power of the television 20 to the television 20. Upon receiving the power control command, the television 20 turns off its power. In the second modification, the same advantages as the third embodiment can be obtained.

Third Modification of Third Embodiment

In the above third embodiment, the first extracting unit 111 extracts living activities for which the resources are likely to compete with each other in step 704 of FIG. 7. Moreover, the second extracting unit 112 judges whether resources have been secured for the living activity in step 906 of FIG. 11. That is, in the third embodiment, it is judged whether resources have been secured for only the living activities for which the resources are likely to compete.

Alternatively, the second extracting unit 112 may judge whether resources have been secured for each device of which the log information has been input. The notifying unit 107 may notify the mobile terminal 12 of the information on the device for which resources have not been secured via the communicating unit 102. The device controller 108 may transmit the power control command for turning off the power of the device for which resources have not been secured to the device for which resources have not been secured.

For example, log information indicating that the power is turned on is input from the television 20 via the communicating unit 102 although the user A1 is not in the house A2. In this case, since the user A1 is not in the house A2, the estimating unit 103 does not estimate that the user A1 is performing the television watching activity. Thus, the event that the power of the television 20 is turned on cannot be said to be a living activity (that is, an inhibited living activity) of which the purpose is not achieved.

However, in this case, the resources of the human visual and auditory senses have not been secured for the television 20. Thus, as illustrated in FIG. 15, the notifying unit 107 may display a message 71 on the display portion 12B of the mobile terminal 12 and the device controller 108 may display an operation button 72 on the display portion 12B. Moreover, when the operation button 72 is operated, the device controller 108 may transmit a power control command for turning off the power of the television 20 to the television 20 via the communicating unit 102.

Further alternatively, when the user A1 stays in a place such as an another person's house or a hotel, and if the other person's house or the hotel is a registered user of the server 11b of the control system according to the third embodiment, the similar processing may be performed. For example, a message "The television (living room) of the user A1 remains turned on" may be displayed on the television of the other person's house or the hotel. Further, an operation button "The television of the user A1 will be turned off" may be displayed on the television, and when the operation button is operated, a power control command for turning off the power of the television of the user A1 may be transmitted.

Fourth Modification of Third Embodiment

A program having been watched may be recorded instead of or in addition to turning off the power of the television 20. In this modification, the control system includes a recording device connected to the network 22. Moreover, the device controller 108 transmits a control command for displaying an operation button "The program having been watched will be recorded," for example, on the display portion 12B of the mobile terminal 12 to the mobile terminal 12. When the operation button "The program having been watched will be recorded" is operated, the device controller 108 transmits a control command for recording the program having been watched to the recording device connected to the network 22. According to the fourth modification, it is possible to reduce the number of operations for recording the program having been watched.

Fourth Embodiment

Figure 16:
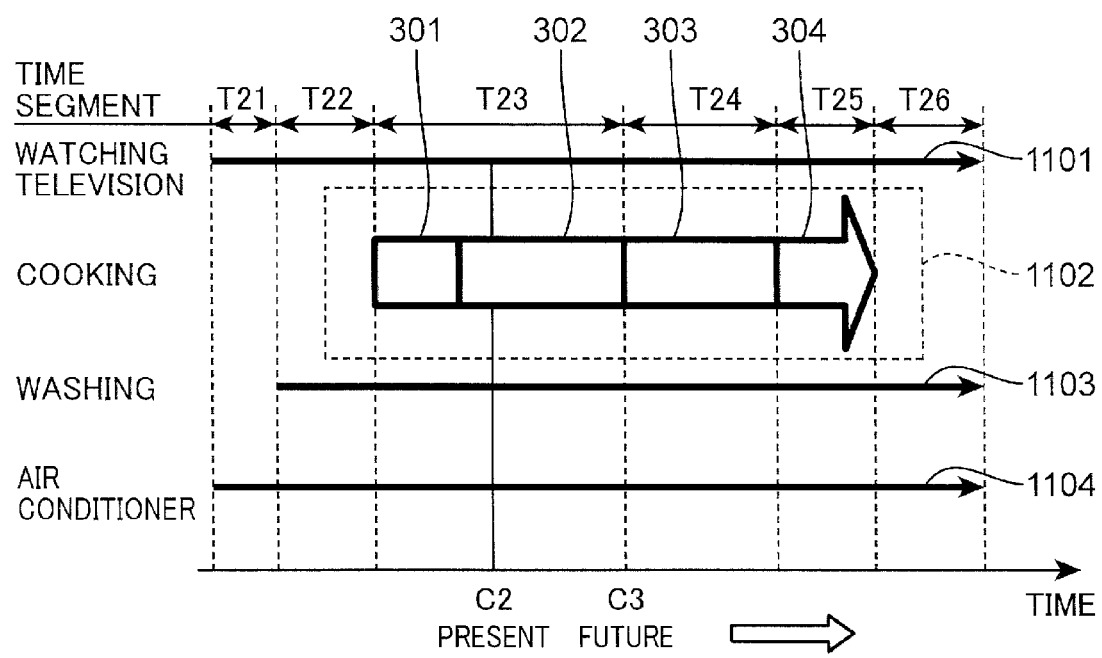
FIG. 16 is a diagram illustrating all living activities estimated by an estimating unit according to a fourth embodiment.
Figure 18:
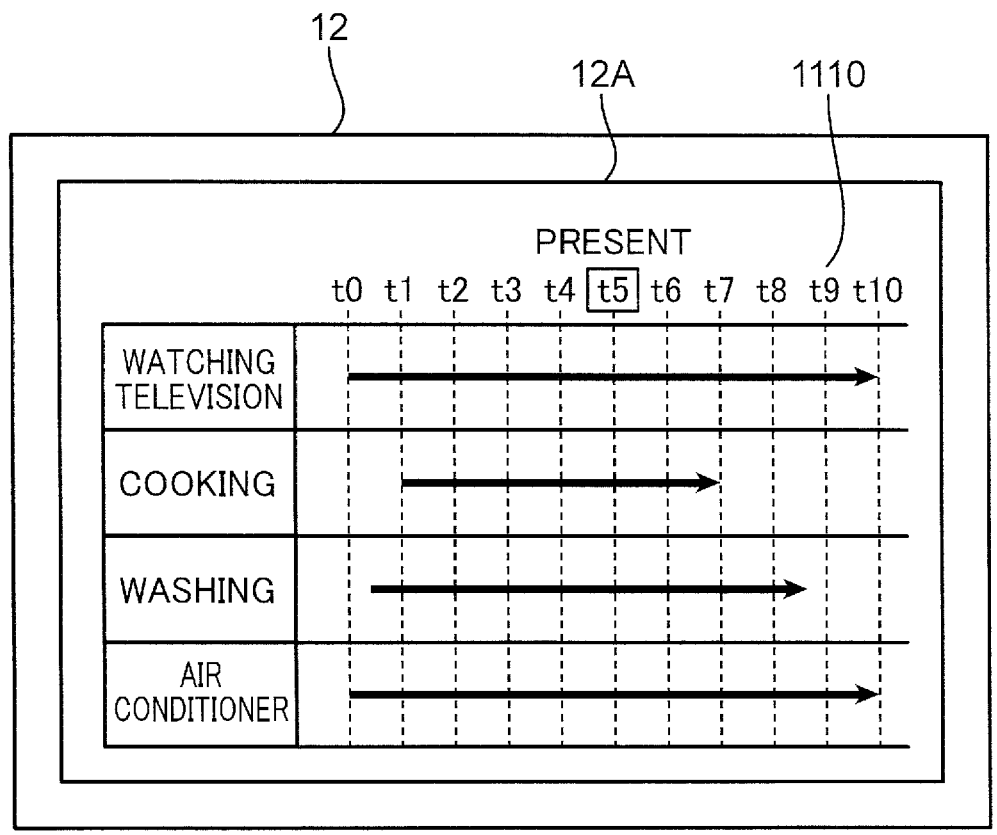
FIG. 18 is a diagram illustrating living activities displayed on a display portion of a mobile terminal according to the fourth embodiment.

FIG. 16 is a diagram illustrating all living activities estimated by an estimating unit 103 according to a fourth embodiment. FIG. 17 is a diagram illustrating a living activity resource table 801a according to the fourth embodiment. FIG. 18 is a diagram illustrating living activities displayed on a display portion 12A of a mobile terminal 12 according to the fourth embodiment. In the fourth embodiment, the same components as those of the first and second embodiments will be denoted by the same reference numerals.

The server of the fourth embodiment has the same configuration as the server 11a of the second embodiment illustrated in FIG. 12. The control system of the fourth embodiment is the same as that of the first embodiment illustrated in FIG. 2, except that the control system includes a server 11a instead of the server 11. Hereinafter, the fourth embodiment will be described focusing on a difference from the first and second embodiments.

In the fourth embodiment, an estimating unit 103 estimates living activities at a present point in time and predicts future living activities. Based on the future living activities predicted by the estimating unit 103, an extracting unit 104 predicts an inhibited living activity in the future according to the same algorithm as the first embodiment.

As described in the first embodiment, a certain queue of items of log information of a certain device is estimated to result from a certain living activity based on a probability (that is, with a certain likelihood). In the cooking activity illustrated in FIG. 5, the likelihood of a cooking activity increases gradually as the time advances from t1 to t6. That is, the likelihood of the cooking activity does not jump from 0 to 1 at a certain point in time. In the example of the cooking activity illustrated in FIG. 5, if the likelihood exceeds a threshold around the time t4, the estimating unit 103 estimates that a cooking activity is performed.

The idea of estimating a living activity that has caused the log information at an intermediate point in time (for example, the time t4) of the device log information 400 illustrated in FIG. 5 can be used for estimating a living activity that the user will execute in the future from a situation at the time t4.

FIG. 16 illustrates living activities of a user E1 estimated by the estimating unit 103. The estimating unit 103 estimates four living activities of a television watching activity 1101, a cooking activity 1102, a washing activity 1103, and an air-conditioner activity 1104 as the living activities of the user E1. Similarly to the first embodiment illustrated in FIG. 3, the cooking activity 1102 includes four sub-activities of a sub-activity 301 of "preparation of food materials," a sub-activity 302 of "preliminary arrangements for food materials," a sub-activity 303 of "cooking of food materials," and a sub-activity 304 of "table setting."

In the present fourth embodiment, at a present point in time C2, the estimating unit 103 estimates four living activities of the television watching activity 1101, the cooking activity 1102, the washing activity 1103, and the air-conditioner activity 1104 as the living activities of the user E1. Here, focusing on the cooking activity 1102, at the present point in time C2, the user E1 performs the sub-activity 302 of "preliminary arrangements of food materials." That is, the estimating unit 103 determines at time C2 that "Cooking seems to have started" and estimates the cooking activity 1102.

Moreover, the estimating unit 103 predicts that the sub-activity 303 of "cooking of food materials" will begin at a future point in time C3 based on the cooking activity task model 300 illustrated in FIG. 3. Further, in the present fourth embodiment, data or the like related to the past cooking activity of the user E1 is stored in the storage device 105. Based on the stored data, the estimating unit 103 predicts a specific model number of the cookware used for the cooking activity.

Based on the living activity at the future point in time C3 and the information on the specific cookware being used, estimated by the estimating unit 103, the second extracting unit 112 of the extracting unit 104 extracts a living activity inhibited at the future point in time C3 in the same manner as extracting the living activity inhibited at the present point in time C2.

In the present fourth embodiment, the living activity resource table 801a illustrated in FIG. 17 is stored in the storage device 105. In the living activity resource table 801a, as illustrated in FIG. 17, an electric power resource 803 required for the cooking activity is defined for each sub-activity of the cooking activity.

The second extracting unit 112 extracts an inhibited living activity associated with the user E1 at the future point in time C3 (the starting point of a time segment T24), for example, using the living activity resource table 801a, the resource attribute table 802 (FIG. 9), and the estimated living activities (FIG. 16) of the user E1.

First, in step 702 of FIG. 7, the first extracting unit 111 acquires four living activities of the television watching activity 1101, the cooking activity 1102, the washing activity 1103, and the air-conditioner activity 1104 as the living activities associated with the user E1 at the future point in time C3.

Subsequently, in step 703 of FIG. 7, the first extracting unit 111 reads the living activity resource table 801a illustrated in FIG. 17 from the storage device 105 to acquire resources required for executing the respective living activities acquired in step 702.

Subsequently, in step 704 of FIG. 7, the first extracting unit 111 extracts living activities for which the resources are likely to compete at the future point in time C3. In the present fourth embodiment, the first extracting unit 111 extracts the television watching activity 1101 and the cooking activity 1102 in relation to the human visual and auditory senses. Moreover, the first extracting unit 111 extracts the television watching activity 1101, the cooking activity 1102, the washing activity 1103, and the air-conditioner activity 1104 in relation to electric power. Further, the first extracting unit 111 extracts the cooking activity 1102 and the washing activity 1103 in relation to water.

Subsequently, in steps 906 and 908 of FIG. 11, when the resource has not been secured for the selected living activity, the second extracting unit 112 extracts the selected living activity as a secondary living activity (inhibited living activity). In the present fourth embodiment, the second extracting unit 112 extracts the television watching activity 1101 as a secondary living activity (a living activity inhibited from the cooking activity 1102) in relation to the human visual and auditory sense resources similarly to the first embodiment.

Further, in the present fourth embodiment, the second extracting unit 112 extracts the television watching activity 1101, the cooking activity 1102, the washing activity 1103, and the air-conditioner activity 1104 as the inhibited living activities in relation to the electric power resource. This is based on the following reasons.

Although the electric power resource is sharable, the upper limit thereof is set to 2000 W, as illustrated in the resource attribute table 802 of FIG. 9. On the other hand, the electric power resource required for executing the cooking activity is 100 W for preparation of food materials and preliminary arrangements of food materials and 500 W for cooking of food materials, as illustrated in the living activity resource table 801a of FIG. 17.

Thus, at the point in time C3 when the execution of the sub-activity 303 of "cooking of food materials" starts, the electric power resource required for the four living activities of the television watching activity 1101, the cooking activity 1102, the washing activity 1103, and the air-conditioner activity 1104 becomes 2200 W and exceeds the upper limit of 2000 W.

In this case, even if any one of the television watching activity 1101, the cooking activity 1102, the washing activity 1103, and the air-conditioner activity 1104 is selected in step 905 of FIG. 11, a judgment result of "NO" rather than "YES" is obtained in step 906. Thus, the second extracting unit 112 extracts all the four living activities of the television watching activity 1101, the cooking activity 1102, the washing activity 1103, and the air-conditioner activity 1104 as secondary living activities (inhibited living activities).

The notifying unit 107 transmits a notification control command for displaying a message "If the IH cookware is continuously used in this state, the circuit breaker may cut off the power due to an excess of power consumption," for example, to the mobile terminal 12 or the television 20 via the communicating unit 102.

Moreover, when the washing machine 14, the air conditioner 15, and the IH cookware 18 include an audio user interface, the notifying unit 107 may transmit a notification control command for outputting an audible message "If the IH cookware is continuously used in this state, the circuit breaker may cut off the power due to an excess of power consumption," for example, to the washing machine 14, the air conditioner 15, and the IH cookware 18 via the communicating unit 102.

Further, the notifying unit 107 transmits a display control command for displaying a living activity screen 1110 illustrated in FIG. 18 on the display portion 12A of the mobile terminal 12 to the mobile terminal 12 via the communicating unit 102. In the living activity screen 1110, as illustrated in FIG. 18, living activities including past living activities and future predicted living activities are arranged on a single time axis with the present point in time at the center. The notifying unit 107 may display the living activity screen 1110 on the display portion 12A while updating the same in real-time so that the present point in time is always at the center of the screen. In the present embodiment, the server 11a corresponds to an example of the information processing apparatus, the operation of the estimating unit 103 estimating the future living activity based on the acquired device information corresponds to an example of the estimating step, step 704 of FIG. 7 corresponds to an example of the competition extracting step, step 906 of FIG. 11 corresponds to an example of the resource judging step, step 908 of FIG. 11 corresponds to an example of the inhibition extracting step, the point in time C3 corresponds to an example of the predetermined future point in time, the mobile terminal 12 corresponds to an example of the third apparatus, and the operation of the notifying unit 107 corresponds to an example of the display control step.

As described above, in the fourth embodiment, the estimating unit 103 predicts a future living activity of the user. The first extracting unit 111 extracts living activity groups of which the resources are likely to compete in the future. The second extracting unit 112 extracts living activities for which the resources are not likely to be secured in the future as inhibited living activities. The notifying unit 107 notifies the user of the inhibited living activities in the future. Thus, according to the fourth embodiment, the user may be able take measures against the inhibited living activities in the future.

The specific embodiments described above include inventions having configurations as described below.

A control method according to an aspect of the present invention is a control method of an information processing apparatus which is connected to a network and includes a storage unit that stores predetermined resource information related to a resource required for a living activity of a user, the method comprising: an acquiring step of acquiring device information from a device connected to the network; an estimating step of estimating a living activity of the user based on the device information acquired in the acquiring step; a competition extracting step of, when living activities are estimated as the living activity of the user in the estimating step, extracting a living activity group including living activities for which the resources are likely to compete among the living activities estimated in the estimating step, based on the resource information stored in the storage unit; a resource judging step of judging whether a required resource has been secured for each of the living activities included in the living activity group extracted in the competition extracting step, based on the device information acquired in the acquiring step and the resource information stored in the storage unit; and an inhibition extracting step of extracting, as an inhibited living activity, a living activity for which it has been judged in the resource judging step that the required resource has not been secured.

According to this configuration, predetermined resource information related to a resource required for a living activity of a user is stored in a storage unit included in an information processing apparatus. In an acquiring step, device information is acquired from a device connected to the network. In an estimating step, a living activity of the user is estimated based on the device information acquired in the acquiring step. In a competition extracting step, when living activities are estimated as the living activity of the user in the estimating step, a living activity group including living activities for which the resources are likely to compete among the living activities estimated in the estimating step is extracted based on the resource information stored in the storage unit. In a resource judging step, it is judged whether a required resource has been secured for each of the living activities included in the living activity group extracted in the competition extracting step, based on the device information acquired in the acquiring step and the resource information stored in the storage unit. In an inhibition extracting step, a living activity for which it has been judged in the resource judging step that the required resource has not been secured is extracted as an inhibited living activity. Thus, it is possible to take measures for the inhibited living activity.

In the control method, the method may further include a notification control step of transmitting, to the device, a notification control command for notifying the user of inhibition information on the inhibited living activity, the device may include a first apparatus used for the inhibited living activity extracted in the inhibition extracting step and a second apparatus different from the first apparatus, and the notification control step may involve transmitting the notification control command to the second apparatus.

According to this configuration, the device includes a first apparatus used for the inhibited living activity extracted in the inhibition extracting step and a second apparatus different from the first apparatus. In a notification control step, a notification control command for notifying the user of inhibition information on the inhibited living activity is transmitted to the second apparatus. Thus, the second apparatus notifies the user of the inhibition information upon receiving the notification control command. Hence, it is possible to notify the user of the inhibition information by means of the second apparatus. As a result, the user can take measures such as stopping the first apparatus used for the inhibited living activity.

In the control method, the second apparatus may be used for the living activity for which it has been judged in the resource judging step that the required resource has been secured.

According to this configuration, the second apparatus is used for the living activity for which it has been judged in the resource judging step that the required resource has been secured. Thus, it is possible to notify the user of the inhibition information by means of the second apparatus used by the user with high accuracy.

In the control method, the method may further include a power control step of transmitting, to the first apparatus, a power control command for turning off the power of the first apparatus.

According to this configuration, in a power control step, a power control command for turning off the power of the first apparatus is transmitted to the first apparatus. Thus, the first apparatus turns off the power upon receiving the power control command. Hence, it is possible to prevent the first apparatus used for the inhibited living activity from being operated unnecessarily.

In the control method, the estimating step may involve estimating a present living activity of the user and estimating a living activity of the user in a predetermined future point in time based on the estimated present living activity of the user, as the living activity of the user, the competition extracting step may involve, when living activities are estimated as the living activity of the user in the predetermined future point in time in the estimating step, extracting a future living activity group including future living activities for which the resources compete among the future living activities estimated in the estimating step, based on the resource information stored in the storage unit, the resource judging step may involve judging whether the required resource has been secured in the predetermined future point in time for each of the future living activities included in the future living activity group extracted in the competition extracting step, based on the device information acquired in the acquiring step and the resource information stored in the storage unit, and the inhibition extracting step may involve extracting, as an inhibited living activity in the predetermined future point in time, a living activity for which it has been judged in the resource judging step that the required resource has not been secured.

According to this configuration, in the estimating step, a present living activity of the user is estimated and a living activity of the user in a predetermined future point in time is estimated based on the estimated present living activity of the user, as the living activity of the user. In the competition extracting step, when living activities are estimated as the living activity of the user in the predetermined future point in time in the estimating step, a future living activity group including future living activities for which the resources compete among the future living activities estimated in the estimating step is extracted based on the resource information stored in the storage unit. In the resource judging step, it is judged whether the required resource has been secured in the predetermined future point in time for each of the future living activities included in the future living activity group extracted in the competition extracting step, based on the device information acquired in the acquiring step and the resource information stored in the storage unit. In the inhibition extracting step, a living activity for which it has been judged in the resource judging step that the required resource has not been secured is extracted as an inhibited living activity in the predetermined future point in time. Thus, it is possible to take measures for the future inhibited living activity at the present point in time.

In the control method, the method may further include a display control step of transmitting, to the device, a display control command for displaying the present living activity of the user and the living activity of the user in the predetermined future point in time estimated in the estimating step, the device may include a third apparatus having a display portion, and the display control step may involve transmitting the display control command to the third apparatus.

According to this configuration, in a display control step, a display control command for displaying the present living activity of the user and the living activity of the user in the predetermined future point in time estimated in the estimating step is transmitted to the third apparatus. Thus, the third apparatus displays the present living activity of the user and the living activity of the user in the predetermined future point in time on the display portion upon receiving the display control command. Hence, the user can easily understand the future inhibited living activity.

In the control method, a living activity resource table, in which the living activity of the user and the resources required for the living activity are correlated with each other, may be stored in the storage unit as the resource information, and the competition extracting step may involve extracting living activities for which the resources are the same, as the living activity group.

According to this configuration, a living activity resource table, in which the living activity of the user and the resources required for the living activity are correlated with each other, is stored in the storage unit as the resource information. In the competition extracting step, living activities for which the resources are the same is extracted as the living activity group. Thus, it is possible to suitably extract the living activity group including living activities for which the resources compete with each other.

In the control method, a resource attribute table representing, as an attribute of the resource, share information indicating whether or not the resource is sharable for living activities of the user may be stored in the storage unit as the resource information, and the resource judging step may involve judging that the living activity of which the device information acquired in the acquiring step indicates that the resource is being used is a living activity for which the resource has been secured, and judging that the living activity of which the device information acquired in the acquiring step does not indicate that the resource is being used is a living activity for which the resource has not been secured, when the resources required for the living activities included in the living activity group extracted in the competition extracting step are the same and are non-sharable.

According to this configuration, a resource attribute table representing, as an attribute of the resource, share information indicating whether or not the resource is sharable for living activities of the user is stored in the storage unit as the resource information. In the resource judging step, it is judged that the living activity of which the device information acquired in the acquiring step indicates that the resource is being used is a living activity for which the resource has been secured, when the resources required for the living activities included in the living activity group extracted in the competition extracting step are the same and are non-sharable. On the other hand, it is judged that the living activity of which the device information acquired in the acquiring step does not indicate that the resource is being used is a living activity for which the resource has not been secured. Thus, it is possible to suitably judge whether or not the resource has been secured for the living activity based on the resource attribute table and the device information.

In the control method, the resource attribute table stored in the storage unit may further represent, as the attribute of the resource, upper limit information indicating an upper limit the resource, which is physical, is able to supply, and in a case where the resources required for the living activities included in the living activity group extracted in the competition extracting step are the physical resources and are the same, it may be judged in the resource judging step that the living activities in the living activity group are living activities for which the resources have been secured when the sum of the resources required for the living activities included in the living activity group does not exceed the upper limit, and it is judged in the resource judging step that the living activities in the living activity group are living activities for which the resources have not been secured when the sum exceeds the upper limit.

According to this configuration, the resource attribute table stored in the storage unit further represents, as the attribute of the resource, upper limit information indicating an upper limit the resource, which is physical, is able to supply. In the resource judging step, in a case where the resources required for the living activities included in the living activity group extracted in the competition extracting step are the physical resources and are the same, it is judged that the living activities in the living activity group are living activities for which the resources have been secured when the sum of the resources required for the living activities included in the living activity group does not exceed the upper limit. On the other hand, it is judged in the resource judging step that the living activities in the living activity group are living activities for which the resources have not been secured when the sum exceeds the upper limit. Thus, it is possible to suitably judge whether or not the resource has been secured for the living activity based on the upper limit information in the resource attribute table.

A program according to an aspect of the present invention is a program for controlling an information processing apparatus which is connected to a network and includes a storage unit that stores predetermined resource information related to a resource required for a living activity of a user, the program causing a computer of the information processing apparatus to execute: an acquiring step of acquiring device information from a device connected to the network; an estimating step of estimating a living activity of the user based on the device information acquired in the acquiring step; a competition extracting step of, when living activities are estimated as the living activity of the user in the estimating step, extracting a living activity group including living activities for which the resources are likely to compete among the living activities estimated in the estimating step, based on the resource information stored in the storage unit; a resource judging step of judging whether a required resource has been secured for each of the living activities included in the living activity group extracted in the competition extracting step, based on the device information acquired in the acquiring step and the resource information stored in the storage unit; and an inhibition extracting step of extracting, as an inhibited living activity, a living activity for which it has been judged in the resource judging step that the required resource has not been secured.

According to this configuration, predetermined resource information related to a resource required for a living activity of a user is stored in a storage unit included in an information processing apparatus. In an acquiring step, device information is acquired from a device connected to the network. In an estimating step, a living activity of the user is estimated based on the device information acquired in the acquiring step. In a competition extracting step, when living activities are estimated as the living activity of the user in the estimating step, a living activity group including living activities for which the resources are likely to compete among the living activities estimated in the estimating step is extracted based on the resource information stored in the storage unit. In a resource judging step, it is judged whether a required resource has been secured for each of the living activities included in the living activity group extracted in the competition extracting step, based on the device information acquired in the acquiring step and the resource information stored in the storage unit. In an inhibition extracting step, a living activity for which it has been judged in the resource judging step that the required resource has not been secured is extracted as an inhibited living activity. Thus, it is possible to take measures for the inhibited living activity.

As described above, the control method and the program according to the present disclosure can extract living activities of which the purposes are inhibited when living activities which are one type of user contexts are executed. In this way, it is possible to extract a device which operates unnecessarily at the present. Moreover, it is possible to predict a device which may cause a certain problem in the future based on the living activity of the user.

Thus, the control method and the program according to the present disclosure are suitably used when automatically controlling smart appliances or smart devices, or issuing a warning to the user in compliance with the purpose of the user's activity. Moreover, this technique may be effectively used in an urban area such as a smart city or an interior space of a vehicle as well as the interior space of a house such as a smart house. Therefore, this technique may be broadly used in a case where living activities of a user who uses a device may be estimated from the log information of the device.

INDUSTRIAL APPLICABILITY

The present disclosure is useful as a control method and a program estimating living activities of a user based on device information and extracting living activities that are inhibited due to competition of resources, in a control method and a program for controlling an information processing apparatus connected to a network.

The invention claimed is:

1. A control method of an information processing apparatus which is connected to a network and includes a storage unit that stores predetermined resource information related to a resource required for a living activity of a user, the method comprising:
an acquiring step of acquiring device information from one or more devices connected to the network;
an estimating step of estimating a living activity of the user based on the device information acquired in the acquiring step;
a competition extracting step of, when a plurality of living activities from the one or more devices connected to the network are estimated as the living activity of the user in the estimating step, extracting a living activity group including living activities for which the resources are likely to compete among the plurality of living activities estimated in the estimating step, based on the resource information stored in the storage unit;
a resource judging step of judging whether a required resource has been secured for each of the living activities included in the living activity group extracted in the competition extracting step, based on the device information acquired in the acquiring step and the resource information stored in the storage unit;
an inhibition extracting step of extracting, as an inhibited living activity, a living activity for which it has been judged in the resource judging step that the required resource has not been secured, wherein
a living activity resource table, in which the living activity of the user and the resources required for the living activity are correlated with each other, is stored in the storage unit as the resource information,
the competition extracting step involves extracting living activities for which the resources are the same, as the living activity group,
the one or more devices include a first apparatus used for the inhibited living activity extracted in the inhibition extracting step and a second apparatus different from the first apparatus; and
a power control step of transmitting, to the first apparatus via the network, a power control command for turning off power of the first apparatus, the power of the first apparatus being turned off in response to the power control command to prevent unnecessary consumption of electric power by turning off an apparatus identified as being used for an inhibited living activity for which the required resource has not been secured.

2. The control method according to claim 1, further comprising a notification control step of transmitting, to the one or more devices, a notification control command for notifying the user of inhibition information on the inhibited living activity, wherein
the notification control step involves transmitting the notification control command to the second apparatus.

3. The control method according to claim 2, wherein the second apparatus is used for the living activity for which it has been judged in the resource judging step that the required resource has been secured.

4. The control method according to claim 1, wherein
the estimating step involves estimating a present living activity of the user and estimating a living activity of the user in a predetermined future point in time based on the estimated present living activity of the user, as the living activity of the user,
the competition extracting step involves, when living activities are estimated as the living activity of the user in the predetermined future point in time in the estimating step, extracting a future living activity group including future living activities for which the resources compete among the future living activities estimated in the estimating step, based on the resource information stored in the storage unit,
the resource judging step involves judging whether the required resource has been secured in the predetermined future point in time for each of the future living activities included in the future living activity group extracted in the competition extracting step, based on the device information acquired in the acquiring step and the resource information stored in the storage unit, and
the inhibition extracting step involves extracting, as an inhibited living activity in the predetermined future point in time, a living activity for which it has been judged in the resource judging step that the required resource has not been secured.

5. The control method according to claim 4, further comprising a display control step of transmitting, to the one or more devices, a display control command for displaying the present living activity of the user and the living activity of the user in the predetermined future point in time estimated in the estimating step, wherein
the one or more devices include a third apparatus having a display portion, and the display control step involves transmitting the display control command to the third apparatus.

6. The control method according to claim 1, wherein a resource attribute table representing, as an attribute of the resource, share information indicating whether or not the resource is sharable for living activities of the user is stored in the storage unit as the resource information, and the resource judging step involves judging that the living activity of which the device information acquired in the acquiring step indicates that the resource is being used is a living activity for which the resource has been secured, and judging that the living activity of which the device information acquired in the acquiring step does not indicate that the resource is being used is a living activity for which the resource has not been secured, when the resources required for the living activities included in the living activity group extracted in the competition extracting step are the same and are non-sharable.

7. The control method according to claim 6, wherein the resource attribute table stored in the storage unit further represents, as the attribute of the resource, upper limit information indicating an upper limit the resource, which is physical, is able to supply, and in a case where the resources required for the living activities included in the living activity group extracted in the competition extracting step are the physical resources and are the same, it is judged in the resource judging step that the living activities in the living activity group are living activities for which the resources have been secured when the sum of the resources required for the living activities included in the living activity group does not exceed the upper limit, and it is judged in the resource judging step that the living activities in the living activity group are living activities for which the resources have not been secured when the sum exceeds the upper limit.

8. A non-transitory computer readable recording medium which stores a program for controlling an information processing apparatus which is connected to a network and includes a storage unit that stores predetermined resource information related to a resource required for a living activity of a user, the program causing a computer of the information processing apparatus to execute:

an acquiring step of acquiring device information from one or more devices connected to the network;

an estimating step of estimating a living activity of the user based on the device information acquired in the acquiring step;

a competition extracting step of, when a plurality of living activities from the one or more devices connected to the network are estimated as the living activity of the user in the estimating step, extracting a living activity group including living activities for which the resources are likely to compete among the plurality of living activities estimated in the estimating step, based on the resource information stored in the storage unit;

a resource judging step of judging whether a required resource has been secured for each of the living activities included in the living activity group extracted in the competition extracting step, based on the device information acquired in the acquiring step and the resource information stored in the storage unit;

an inhibition extracting step of extracting, as an inhibited living activity, a living activity for which it has been judged in the resource judging step that the required resource has not been secured, wherein
a living activity resource table, in which the living activity of the user and the resources required for the living activity are correlated with each other, is stored in the storage unit as the resource information, the competition extracting step involves extracting living activities for which the resources are the same, as the living activity group, the one or more devices include a first apparatus used for the inhibited living activity extracted in the inhibition extracting step and a second apparatus different from the first apparatus; and a power control step of transmitting, to the first apparatus via the network, a power control command for turning off power of the first apparatus, the power of the first apparatus being turned off in response to the power control command to prevent unnecessary consumption of electric power by turning off an apparatus identified as being used for an inhibited living activity for which the required resource has not been secured.

* * * * *